(12) United States Patent
Lai et al.

(10) Patent No.: US 12,537,669 B2
(45) Date of Patent: Jan. 27, 2026

(54) IDENTITY AUTHENTICATION METHOD AND APPARATUS, STORAGE MEDIUM, PROGRAM, AND PROGRAM PRODUCT

(71) Applicant: CHINA IWNCOMM CO., LTD., Shaanxi (CN)

(72) Inventors: Xiaolong Lai, Xi'an (CN); Jun Cao, Xi'an (CN); Manxia Tie, Xi'an (CN); Qin Li, Xi'an (CN); Xiaorong Zhao, Xi'an (CN); Bianling Zhang, Xi'an (CN); Zhenhai Huang, Xi'an (CN); Chaofan Shao, Xi'an (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 212 days.

(21) Appl. No.: 18/259,299

(22) PCT Filed: Dec. 21, 2021

(86) PCT No.: PCT/CN2021/140109
§ 371 (c)(1),
(2) Date: Jun. 26, 2023

(87) PCT Pub. No.: WO2022/135401
PCT Pub. Date: Jun. 30, 2022

(65) Prior Publication Data
US 2024/0097887 A1 Mar. 21, 2024

(30) Foreign Application Priority Data
Dec. 26, 2020 (CN) .......................... 202011569198.7

(51) Int. Cl.
*H04L 9/08* (2006.01)
*H04L 9/32* (2006.01)

(52) U.S. Cl.
CPC .......... *H04L 9/0825* (2013.01); *H04L 9/0861* (2013.01); *H04L 9/3228* (2013.01)

(58) Field of Classification Search
CPC .... H04L 9/0825; H04L 9/0861; H04L 9/3228
See application file for complete search history.

(56) References Cited

U.S. PATENT DOCUMENTS 6,769,060 B1 7/2004 Dent
10,411,894 B1 * 9/2019 Yavnilovich .......... H04W 12/06
(Continued)

FOREIGN PATENT DOCUMENTS

CN 101286843 A 10/2008
CN 101594233 A 12/2009
(Continued)

OTHER PUBLICATIONS

Supplementary European Search Report in the European application No. 21909397.8, mailed on May 7, 2024. 8 pages.
(Continued)

*Primary Examiner* — Techane Gergiso
(74) *Attorney, Agent, or Firm* — Cooper Legal Group, LLC

(57) ABSTRACT

An identity authentication method is disclosed in embodiments of the present application. When a requester and an authentication access controller perform identity authentication using an authentication mechanism of a pre-shared key, the identity information of entities is transmitted in the form of ciphertext, thereby preventing the identity information of the entities from being exposed during the transmission, so that attackers cannot obtain private or sensitive information. The mutual or unilateral identity authentication between the authentication access controller and the requester is achieved while ensuring the confidentiality of the entity identity and related information, thereby laying a
(Continued)

foundation for ensuring that the user accessing the network is legitimate and/or the network accessed by the user is legitimate. Meanwhile, in connection with key exchange calculations and by an ingenious and detailed design, the ability of the authentication process to resist dictionary brute force attacks or quantum computing attacks is enhanced. Further disclosed in embodiments of the present application are an identity authentication apparatus, a storage medium, a program, and a program product.

21 Claims, 7 Drawing Sheets

(56) References Cited

U.S. PATENT DOCUMENTS

| | | | | |
|---|---|---|---|---|
| 2006/0281442 | A1* | 12/2006 | Lee | H04L 63/0876 455/412.2 |
| 2007/0101400 | A1* | 5/2007 | Freeman | H04L 9/0841 726/2 |
| 2010/0293370 | A1 | 11/2010 | Xiao | |
| 2011/0004762 | A1* | 1/2011 | Horn | H04W 12/04 713/171 |
| 2011/0238996 | A1* | 9/2011 | Xiao | H04L 63/0876 713/175 |
| 2012/0159587 | A1* | 6/2012 | Ge | H04L 63/061 726/6 |
| 2013/0205374 | A1* | 8/2013 | Du | H04L 63/08 726/4 |
| 2013/0212390 | A1 | 8/2013 | Du | |
| 2014/0082715 | A1* | 3/2014 | Grajek | H04W 12/068 726/8 |
| 2014/0101743 | A1* | 4/2014 | Busboom | H04L 63/20 726/7 |
| 2014/0351887 | A1* | 11/2014 | Liu | H04W 12/06 726/3 |
| 2015/0135294 | A1* | 5/2015 | Du | H04L 63/08 726/7 |
| 2015/0163056 | A1* | 6/2015 | Nix | H04B 1/3816 |
| 2016/0277400 | A1* | 9/2016 | Maurya | H04L 63/18 |
| 2017/0310475 | A1 | 10/2017 | Hu | |
| 2018/0332471 | A1* | 11/2018 | Zhu | H04L 63/061 |
| 2019/0149329 | A1* | 5/2019 | Wu | H04W 4/70 713/155 |
| 2019/0156019 | A1* | 5/2019 | Chen | H04W 12/0433 |
| 2019/0281453 | A1* | 9/2019 | Shi | H04L 63/0823 |
| 2020/0296113 | A1* | 9/2020 | Agarwal | H04L 63/0876 |
| 2021/0014226 | A1* | 1/2021 | Zhao | H04L 9/50 |
| 2021/0184841 | A1* | 6/2021 | Shpurov | H04L 9/3263 |
| 2021/0219138 | A1* | 7/2021 | Comarmond | H04W 12/69 |
| 2021/0367753 | A1* | 11/2021 | Shang | H04L 9/3247 |

FOREIGN PATENT DOCUMENTS

| | | |
|---|---|---|
| CN | 102752269 A | 10/2012 |
| CN | 106790173 A | 5/2017 |
| CN | 106921640 A | 7/2017 |
| CN | 111028397 A | 4/2020 |
| EP | 2234366 A1 | 9/2010 |

OTHER PUBLICATIONS

International Search Report in the international application No. PCT/CN2021/140109, mailed on Mar. 24, 2022. 3 pages.
English translation of the Written Opinion of the International Search Authority in the international application No. PCT/CN2021/140109, mailed on Mar. 23, 2022. 4 pages.

* cited by examiner

IDENTITY AUTHENTICATION METHOD AND APPARATUS, STORAGE MEDIUM, PROGRAM, AND PROGRAM PRODUCT

CROSS-REFERENCE TO RELATED APPLICATIONS

The present application is based on and claims the priority to the Chinese patent application having the application number of 202011569198.7 and the filing date of 26 Dec. 2020, entitled "IDENTITY AUTHENTICATION METHOD AND APPARATUS", the entire content of which is incorporated herein by reference.

TECHNICAL FIELD

The present application relates to the technical field of network communication security, particularly to an identity authentication method and apparatus, a storage medium, a program, and a program product.

BACKGROUND

In a communication network, a requester may access the network by means of an authentication access controller. In some cases in which security requirements are relatively high, the authentication access controller needs to authenticate the identity of the requester, and/or the requester also needs to authenticate the identity of the authentication access controller, thereby laying a foundation for ensuring that the requester accessing the network belongs to a legitimate user and/or the network accessed by the requester belongs to a legitimate network. Furthermore, node-to-node transmission in blockchain technology also requires that a trust relationship is established between different nodes. Therefore, identity authentication performed on nodes is also very important.

Currently, the requester and the authentication access controller may perform identity authentication using an authentication mechanism of a pre-shared key, but the identity information of entities is typically not carried in this process. That is, as long as the pre-shared key of the other party is verified, it can be judged whether the other party is legitimate. However, in fact, it is not known who the other party is, and in essence, the real authentication for the identity of the other party has not been achieved. In some schemes, although the identity information is carried while verifying the pre-shared key of the other party, the identity information of the entities is often directly exposed during the transmission of authentication messages. Moreover, the identity information of the entities includes some private or sensitive information of the entities, such as identity card numbers, home addresses, bank card information, etc., and if the information were intercepted by attackers and then used to engage in illegal activities, the consequences would be disastrous.

SUMMARY

An identity authentication method and apparatus, a storage medium, a program, and a program product are provided in embodiments of the present application, in which mutual or unilateral identity authentication between an authentication access controller and a requester is achieved by using a pre-shared key while ensuring the confidentiality of the entity identity and related information, thereby laying a foundation for ensuring that a user accessing a network is a legitimate user and/or the network accessed by a user is a legitimate network. Meanwhile, by selecting to use a key exchange calculation and through an ingenious detailed design, the ability of the authentication process to resist quantum computing attacks or resist dictionary brute force attacks is enhanced.

In a first aspect, an identity authentication method is provided in an embodiment of the present application, wherein one party of a requester and an authentication access controller serves as a verified party, and the other party serves as a corresponding verifying party. The method comprises the following operations.

The verifying party and the verified party, respectively, send their own identity ciphertext to each other, and decrypt the identity ciphertext of the other party to obtain the identity of the other party. The identity ciphertext of the verifying party is generated by the verifying party using a message encryption key to encrypt information comprising the identity of the verifying party, and the identity ciphertext of the verified party is generated by the verified party using the message encryption key to encrypt information comprising the identity of the verified party.

The verified party and the verifying party, respectively, determine, according to the identity of the other party, a key pre-shared with the other party;

The verified party calculates an identity authentication code of the verified party using the key pre-shared with the verifying party.

The verifying party receives the identity authentication code of the verified party sent by the verified party, checks the received identity authentication code of the verified party using the key pre-shared with the verified party, and determines an identity authentication result of the verified party according to a check result.

In a second aspect, an authentication access controller is provided in an embodiment of the present application. The authentication access controller comprises: a processing portion and a requesting portion.

The processing portion is configured to receive identity ciphertext of a requester sent by the requester, and to decrypt the identity ciphertext of the requester to obtain the identity of the requester. The identity ciphertext of the requester is generated by the requester using a message encryption key to encrypt information comprising the identity of the requester.

The requesting portion is configured to send identity ciphertext of the authentication access controller to the requester. The identity ciphertext of the authentication access controller is generated by the authentication access controller using the message encryption key to encrypt information comprising the identity of the authentication access controller.

When the authentication access controller serves as a verified party, the requesting portion is further configured to send an identity authentication code of the authentication access controller to the requester, the identity authentication code of the authentication access controller being generated by the authentication access controller according to a key pre-shared with the requester; and/or when the authentication access controller serves as a verifying party, the authentication access controller further comprises: a verification portion, configured to receive the identity authentication code of the requester sent by the requester, to determine, according to the identity of the requester, the key pre-shared with the requester, to check the received identity authentication code of the requester by using the key pre-shared with the requester, and to determine, according to a check result, an identity authentication result of the requester.

In a third aspect, a requester is provided in an embodiment of the present application. The requester comprises a processing portion and a requesting portion.

The processing portion is configured to receive identity ciphertext of an authentication access controller sent by the authentication access controller, and to decrypt the identity ciphertext of the authentication access controller to obtain the identity of the authentication access controller. The identity ciphertext of the authentication access controller is generated by the authentication access controller using a message encryption key to encrypt information comprising the identity of the authentication access controller.

The requesting portion is configured to send identity ciphertext of the requester to the authentication access controller. The identity ciphertext of the requester is generated by the requester using the message encryption key to encrypt information comprising the identity of the requester.

When the requester serves as a verified party, the requesting portion is further configured to send an identity authentication code of the requester to the authentication access controller, the identity authentication code of the requester being generated by the requester according to a key pre-shared with the authentication access controller; and/or when the requester serves as a verifying party, the requester further comprises: a verification portion, configured to receive the identity authentication code of the authentication access controller sent by the authentication access controller, to determine, according to the identity of the authentication access controller, the key pre-shared with the authentication access controller, to check the received identity authentication code of the authentication access controller by using the key pre-shared with the authentication access controller, and to determine, according to a check result, an identity authentication result of the authentication access controller.

In a fourth aspect, an authentication access controller is further provided in an embodiment of the present application. The authentication access controller comprises a first processor and a first memory for storing an instruction executable by the first processor. The first processor is configured to invoke the instruction stored by the first memory, so as to perform the steps performed by the authentication access controller described in the first aspect.

In a fifth aspect, a requester is further provided in an embodiment of the present application. The requester comprises a second processor and a second memory for storing an instruction executable by the second processor. The second processor is configured to invoke the instruction stored by the second memory, so as to perform the steps performed by the requester described in the first aspect.

In a sixth aspect, a computer-readable storage medium is further provided in an embodiment of the present application. The computer-readable storage medium stores thereon a computer program that, when run by a processor, performs the steps performed by the authentication access controller or the requester in the identity authentication method described in the first aspect.

In a seventh aspect, a computer program is further provided in an embodiment of the present application. The computer program comprises a computer-readable code, wherein when the computer-readable code is run in a computer device, a processor in the computer device performs the steps performed by the authentication access controller or the requester in the identity authentication method described in the first aspect.

In an eighth aspect, a computer program product is further provided in an embodiment of the present application. The computer program product comprises computer program instructions, which cause a computer to perform the steps performed by the authentication access controller or the requester in the identity authentication method described in the first aspect.

As can be seen from the above-described technical solutions, when the requester and the authentication access controller perform identity authentication using the authentication mechanism of the pre-shared key, the identity information of the entities is transmitted in the form of ciphertext during the process of transmitting the messages, thereby preventing the identity information of the entities from being exposed during the transmission, so that attackers cannot obtain private or sensitive information. The mutual or unilateral identity authentication between the authentication access controller and the requester is achieved while ensuring the confidentiality of the entity identity and related information, thereby laying a foundation for ensuring that the user accessing the network is legitimate and/or the network accessed by the user is legitimate.

BRIEF DESCRIPTION OF THE DRAWINGS

To more clearly illustrate the technical solutions in the embodiments of the present application or the prior art, the drawings, which will be used in the description of the embodiments or the prior art, will be described briefly below. The drawings in the following description are merely some embodiments of the present application, and for a person of ordinary skill in the art, other drawings may also be obtained according to these figures without any inventive effort.

FIG. 1-2 is a schematic diagram of another identity authentication method provided in an embodiment of the present application;

FIG. 2 is a schematic diagram of a method used by a requester (REQ) and an authentication access controller (AAC) to negotiate a message encryption key according to an embodiment of the present application:

DETAILED DESCRIPTION

Figure 1:
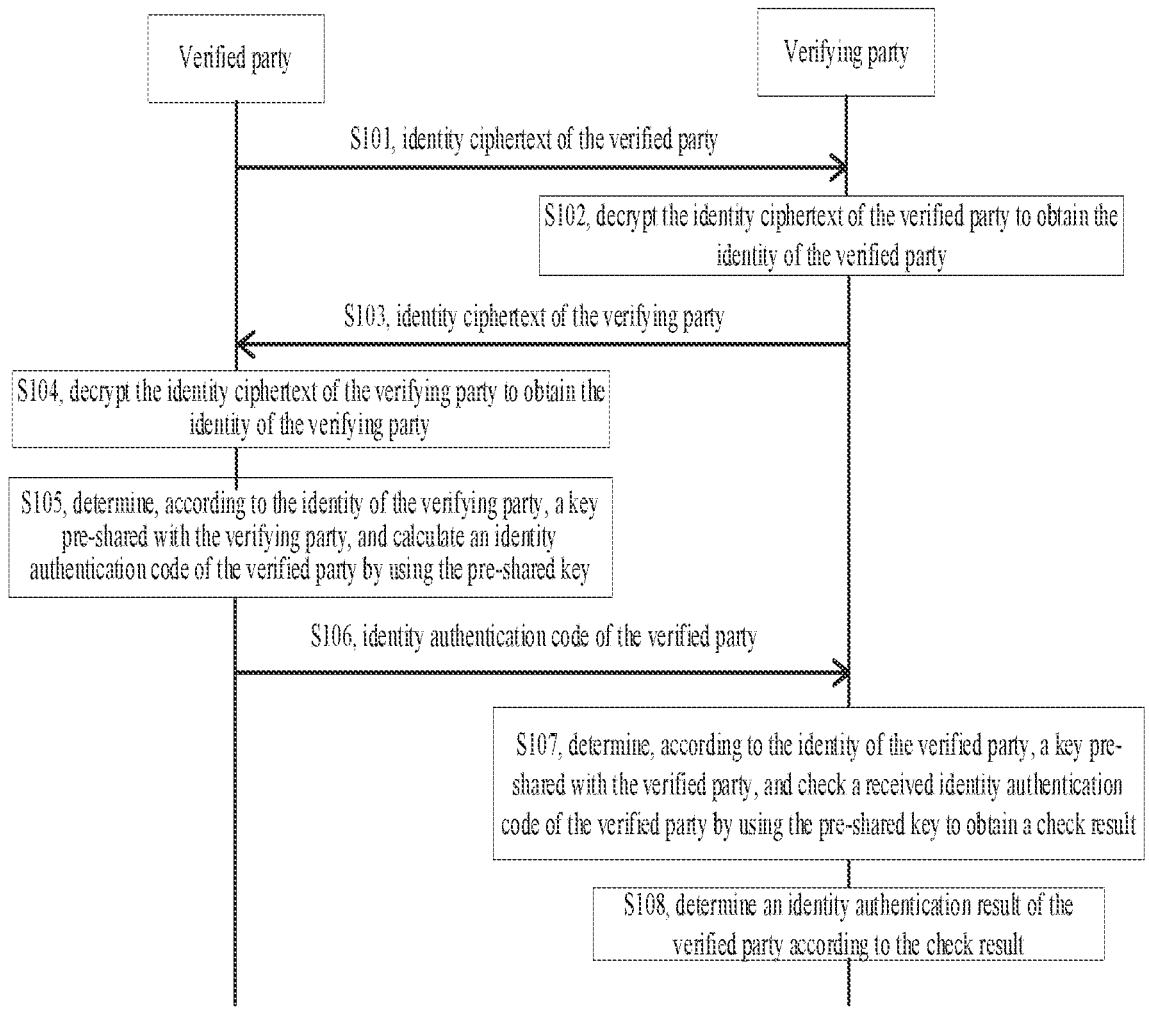
FIG. 1-1 is a schematic diagram of an identity authentication method provided in an embodiment of the present application.

In a communication network, a requester may access the network by means of an authentication access controller. To ensure that the requester accessing the network belongs to a legitimate user and/or the network that the user requests access to is a legitimate network, the authentication access controller and the requester typically need to perform mutual or unilateral identity authentication.

For example, in a scenario in which the requester accesses a wireless network by means of the authentication access controller, the requester may be a terminal device such as a mobile phone, a personal digital assistant (PDA), or a tablet, and the authentication access controller may be a wireless access point. In a scenario in which the requester accesses a wired network by means of the authentication access controller, the requester may be a terminal device such as a desktop or a notebook computer, and the authentication access controller may be a switch, a router, etc. In a scenario in which the requester accesses a network of the 4th/5th Generation mobile communication technology (4G/5G) by means of the authentication access controller, the requester may be a mobile phone, and the authentication access controller may be a base station. Certainly, the present application is likewise applicable to various data communication scenarios such as other wired networks, near-field communication networks, etc.

In the process of performing identity authentication on the requester, the requester needs to provide its own identity information so that the authentication access controller performs identity authentication on the requester; and in the process of performing identity authentication on the authentication access controller, the authentication access controller needs to provide its own identity information so that the requester performs identity authentication on the authentication access controller. For example, the identity information of an entity may carry information such as an identity card number, a home address, bank card information, a geographical location, and organization information. If an attacker intercepts the identity information of the requester or the authentication access controller, the attacker can obtain the private and sensitive information carried therein and use same for illegal purposes, which will cause great security risks to the authentication access controller, the requester, and even the network.

To solve the above-mentioned technical problems, in an identity authentication method provided in an embodiment of the present application, any one party of an authentication access controller and a requester serves as a verified party, and the other party correspondingly serves as a corresponding verifying party. A message encryption key is pre-shared between the authentication access controller and the requester, or the message encryption key is generated by means of negotiation. The verifying party receives and decrypts identity ciphertext of the verified party sent by the verified party to obtain the identity of the verified party, wherein the identity ciphertext of the verified party is generated by the verified party using the message encryption key to encrypt information including the identity of the verified party. Similarly, the verified party receives and decrypts identity ciphertext of the verifying party sent by the verifying party to obtain the identity of the verifying party, wherein the identity ciphertext of the verifying party is generated by the verifying party using the message encryption key to encrypt information including the identity of the verifying party. The verified party determines, according to the identity of the verifying party, a key pre-shared with the verifying party, and calculates an identity authentication code of the verified party using the pre-shared key. The verifying party receives the identity authentication code of the verified party sent by the verified party, determines a key pre-shared with the verified party according to the identity of the verified party, checks the received identity authentication code of the verified party using the pre-shared key, and determines, according to a check result, an identity authentication result of the verified party.

As can be seen, when the requester and the authentication access controller perform identity authentication using the authentication mechanism of the pre-shared key, the identity information of the entities is transmitted in the form of ciphertext during the process of transmitting the messages, thereby preventing the identity information of the entities from being exposed during the transmission, so that an attacker cannot obtain private or sensitive information. The mutual or unilateral identity authentication between the authentication access controller and the requester is achieved while ensuring the confidentiality of the entity identity and related information, thereby laying a foundation for ensuring that the user accessing the network is a legitimate user and/or the network accessed by the user is a legitimate network.

It should be noted that according to the identity authentication method provided in the embodiment of the present application, not only the mutual identity authentication (MIA) between the authentication access controller and the requester can be achieved, but also unilateral identity authentication for the requester by the authentication access controller (REQ Authentication with an Unauthenticated AAC (RAUA)), and unilateral identity authentication for the authentication access controller by the requester (AAC Authentication with an Unauthenticated REQ (AAUR)) can be achieved.

For ease of description, in the embodiment of the present application, the identity authentication method provided in the embodiment of the present application will be described by taking a requester (REQester (REQ)) and an authentication access controller (AAC) as examples. The REQ may be one endpoint in the identity authentication process, applying to the AAC for a specified access service; and the AAC may be the other endpoint in the identity authentication process, providing the specified access service for the REQ. When the REQ and the AAC have a pre-shared key (PSK), the two parties may use the pre-shared key to realize mutual or unilateral identity authentication between the REQ and the AAC. The PSK is the same key pre-configured or distributed by the REQ and the AAC, and both the REQ and the AAC have IDs that can identify their own identity.

It should be noted that in the identity authentication method of the embodiment of the present application, any one party of the AAC and the REQ may serve as a verified party, the other party may serve as a corresponding verifying party, and the verifying party may be used to verify the identity legitimacy of the verified party, thereby achieving identity authentication.

In one embodiment, the REQ may serve as a verified party and the AAC may serve as a corresponding verifying party, and the AAC may serve as a verified party and the REQ may serve as a corresponding verifying party. The AAC verifies the identity legitimacy of the REQ, and the REQ verifies the identity legitimacy of the AAC, i.e., achieving the mutual identity authentication (MIA) between the REQ and the AAC.

In another embodiment, the REQ may serve as a verified party, and the AAC may serve as a corresponding verifying party. The AAC verifies the identity legitimacy of the REQ, achieving the unilateral identity authentication RAUA of the REQ.

In yet another embodiment, the AAC may serve as a verified party, and the REQ may serve as a corresponding verifying party. The REQ verifies the identity legitimacy of the AAC, achieving the unilateral identity authentication AAUR of the AAC.

Referring to FIG. 1-1, an identity authentication method is described taking the above-mentioned verifying party and verified party as execution subjects. The method comprises the following operations.

S101, the verifying party receives identity ciphertext of the verified party sent by the verified party.

The identity ciphertext of the verified party is generated by the verified party using a message encryption key to encrypt information including the identity of the verified party by using a symmetric encryption algorithm. The message encryption key may be pre-shared by the verifying party and the verified party; or same may also be obtained by negotiation between the verifying party and the verified party, that is, the AAC and the REQ obtain the message encryption key by negotiation. The manner of negotiating the message encryption key will be described in subsequent embodiments.

When the verified party is the REQ, and the verifying party is the AAC, the AAC receives the identity ciphertext $EncData_{REQ}$ of the REQ sent by the REQ. The $EncData_{REQ}$ is generated by the REQ using the message encryption key to encrypt information including the identity $ID_{REQ}$ of the REQ by using the symmetric encryption algorithm. Thus, when identity information is transmitted between the REQ and the AAC, the identity information of the REQ is encrypted, thereby preventing the identity information of the REQ from being exposed during the transmission.

When the verified party is the AAC, and the verifying party is the REQ, the REQ receives the identity ciphertext $EncData_{AAC}$ of the AAC sent by the AAC. The $EncData_{AAC}$ is generated by the AAC using the message encryption key to encrypt information including the identity $ID_{AAC}$ of the AAC by using the symmetric encryption algorithm. Thus, when identity information is transmitted between the REQ and the AAC, the identity information of the AAC is encrypted, thereby preventing the identity information of the AAC from being exposed during the transmission.

S102, the verifying party decrypts the identity ciphertext of the verified party to obtain the identity of the verified party.

Since the identity ciphertext of the verified party is obtained by the verified party using the message encryption key to perform a calculation by using a symmetric encryption algorithm, the verifying party may use the message encryption key to decrypt the identity ciphertext of the verified party by using the symmetric encryption algorithm to obtain the identity of the verified party.

When the verified party is the REQ, and the verifying party is the AAC, the AAC receives the $EncData_{REQ}$ sent by the REQ, and then uses the message encryption key to decrypt the $EncData_{REQ}$ by using the symmetric encryption algorithm to obtain the identity $ID_{REQ}$ of the REQ.

When the verified party is the AAC, and the verifying party is the REQ, the REQ receives the $EncData_{AAC}$ sent by the AAC, and then uses the message encryption key to decrypt the $EncData_{AAC}$ by using the symmetric encryption algorithm to obtain the identity $ID_{AAC}$ of the AAC.

S103, the verified party receives identity ciphertext of the verifying party sent by the verifying party.

The identity ciphertext of the verifying party is generated by the verifying party using the message encryption key to encrypt information including the identity of the verifying party by using the symmetric encryption algorithm.

When the verified party is the REQ, and the verifying party is the AAC, the REQ receives the $EncData_{AAC}$ sent by the AAC. The $EncData_{AAC}$ is generated by the AAC using the message encryption key to encrypt information including the identity $ID_{AAC}$ of the AAC by using the symmetric encryption algorithm.

When the verified party is the AAC, and the verifying party is the REQ, the AAC receives the $EncData_{REQ}$ sent by the REQ. The $EncData_{REQ}$ is generated by the REQ using the message encryption key to encrypt information including the identity $ID_{REQ}$ of the REQ by using the symmetric encryption algorithm.

S104, the verified party decrypts the identity ciphertext of the verifying party to obtain the identity of the verifying party.

Since the identity ciphertext of the verifying party is obtained by the verifying party using the message encryption key to perform a calculation by using a symmetric encryption algorithm, the verified party may use the message encryption key to decrypt the identity ciphertext of the verifying party by using the symmetric encryption algorithm to obtain the identity of the verifying party.

When the verified party is the REQ, and the verifying party is the AAC, the REQ receives the $EncData_{AAC}$ sent by the AAC, and then uses the message encryption key to decrypt the $EncData_{AAC}$ by using the symmetric encryption algorithm to obtain the identity $ID_{AAC}$ of the AAC.

When the verified party is the AAC, and the verifying party is the REQ, the AAC receives the $EncData_{REQ}$ sent by the REQ, and then uses the message encryption key to decrypt the $EncData_{REQ}$ by using the symmetric encryption algorithm to obtain the identity $ID_{REQ}$ of the REQ.

S105, the verified party determines, according to the identity of the verifying party, a key pre-shared with the verifying party, and calculates an identity authentication code of the verified party using the pre-shared key.

The verified party determines the pre-shared key (PSK) pre-shared with the verifying party according to the identity of the verifying party, and uses, according to information including the PSK, a key derivation algorithm to calculate an identity authentication key (IAK). The verified party performs a calculation on first specified information of the verified party using the IAK to generate the identity authentication code of the verified party, where the first specified information of the verified party includes the identity of the verified party.

When the verified party is the REQ, and the verifying party is the AAC, the REQ determines the pre-shared key (PSK) pre-shared with the AAC according to the $ID_{AAC}$, and uses, according to information including the PSK, the key derivation algorithm to calculate the identity authentication key (IAK). Then, the REQ uses the IAK to perform a calculation on the first specified information of the REQ by using an integrity check algorithm to generate the identity authentication code $MIC_{REQ}$ of the REQ, where the first specified information of the REQ includes the identity $ID_{REQ}$ of the REQ.

When the verified party is the AAC, and the verifying party is the REQ, the AAC determines the pre-shared key (PSK) pre-shared with the REQ according to the $ID_{REQ}$, and uses, according to information including the PSK, the key derivation algorithm to calculate the identity authentication key (IAK). Then, the AAC uses the IAK to perform a calculation on the first specified information of the AAC by using an integrity check algorithm to generate the identity authentication code $MIC_{AAC}$ of the AAC, where the first specified information of the AAC includes the identity $ID_{AAC}$ of the AAC.

S106, the verifying party receives the identity authentication code of the verified party sent by the verified party.

S107, the verifying party determines, according to the identity of the verified party, a key pre-shared with the verified party, and checks the received identity authentication code of the verified party using the pre-shared key to obtain a check result.

Illustratively, the verifying party determines the key pre-shared with the verified party according to the identity of the verified party obtained by decryption in S102, calculates the identity authentication key (IAK) according to the pre-shared key, and checks the received identity authentication code of the verified party using the IAK and the first specified information of the verified party interacted between the verifying party and the verified party, so as to obtain the check result. It should be noted that since the verifying party only uses the identity of the verified party in S107, the operation of S102 only needs to be executed before S107.

When the verified party is the REQ, and the verifying party is the AAC, the AAC receives the $MIC_{REQ}$ sent by the REQ, then determines, according to the $ID_{REQ}$ obtained by decryption, the pre-shared key (PSK) pre-shared with the REQ, and checks the received $MIC_{REQ}$ using the identity authentication key (IAK) calculated according to the PSK and the first specified information of the REQ, so as to obtain the check result.

When the verified party is the AAC, and the verifying party is the REQ, the REQ receives the $MIC_{AAC}$ sent by the AAC, then determines, according to the $ID_{AAC}$ obtained by decryption, the pre-shared key (PSK) pre-shared with the AAC, and checks the received $MIC_{AAC}$ using the identity authentication key (IAK) calculated according to the PSK and the first specified information of the AAC, so as to obtain the check result.

S108, the verifying party determines, according to the check result, an identity authentication result of the verified party.

If the check result is that the check succeeds, the verifying party determines that the identity of the verified party is legitimate. If the check result is that the check fails, the verifying party may have the following processing means according to a local policy, including: discarding the received information or determining that the identity of the verified party is non-legitimate.

When the verified party is the REQ, and the verifying party is the AAC, if the check result obtained by the AAC checking the received $MIC_{REQ}$ is that the check succeeds, the AAC determines that the identity authentication result of the REQ is legitimate. If the check result is that the check fails, the AAC may have the following processing means according to a local policy, including: discarding the received $MIC_{REQ}$, determining that the identity authentication result of the REQ is non-legitimate, etc.

When the verified party is the AAC, and the verifying party is the REQ, if the check result obtained by the REQ checking the received $MIC_{AAC}$ is that the check succeeds, the REQ determines that the identity authentication result of the AAC is legitimate. If the check result is that the check fails, the REQ may have the following processing means according to a local policy, including: discarding the received $MIC_{AAC}$, determining that the identity authentication result of the AAC is non-legitimate, etc.

Figures 1, 2:
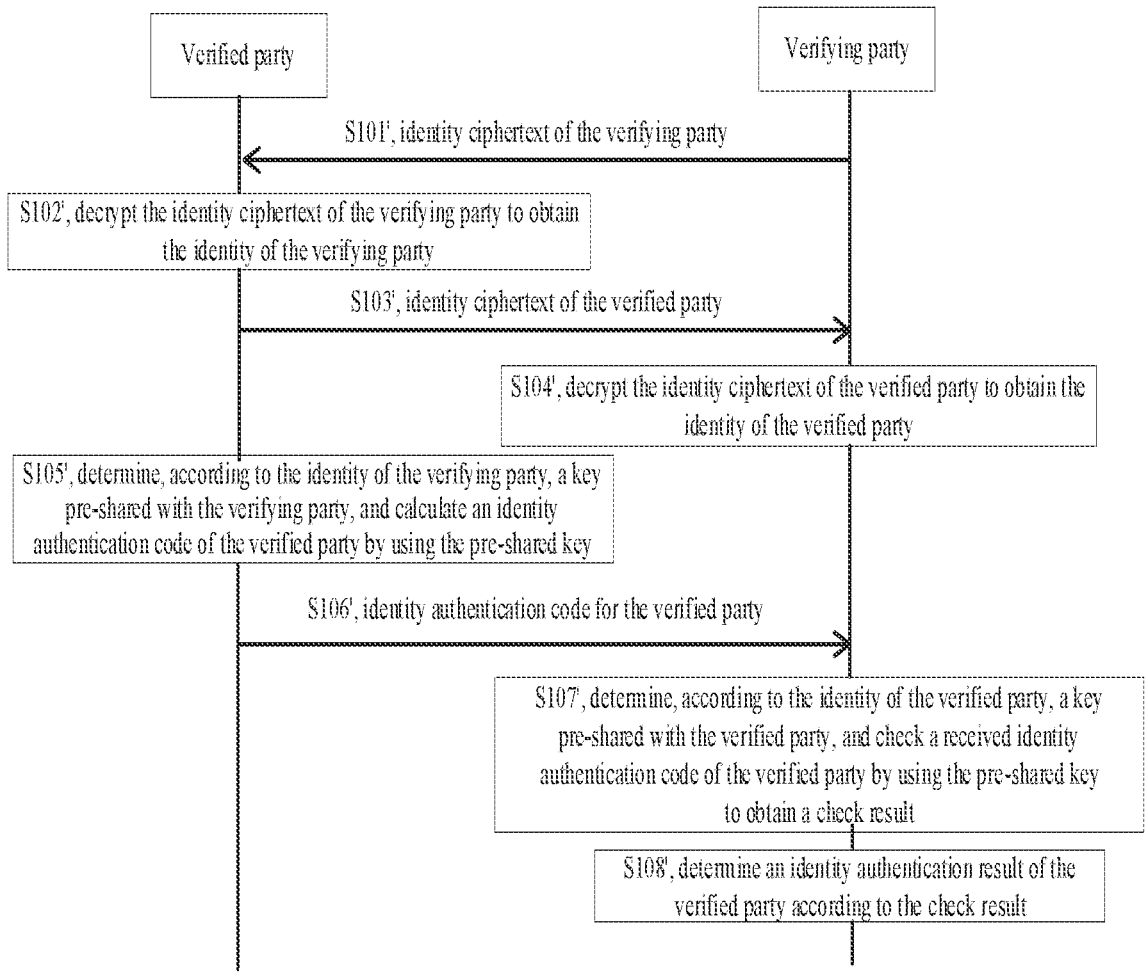
Figure 2:
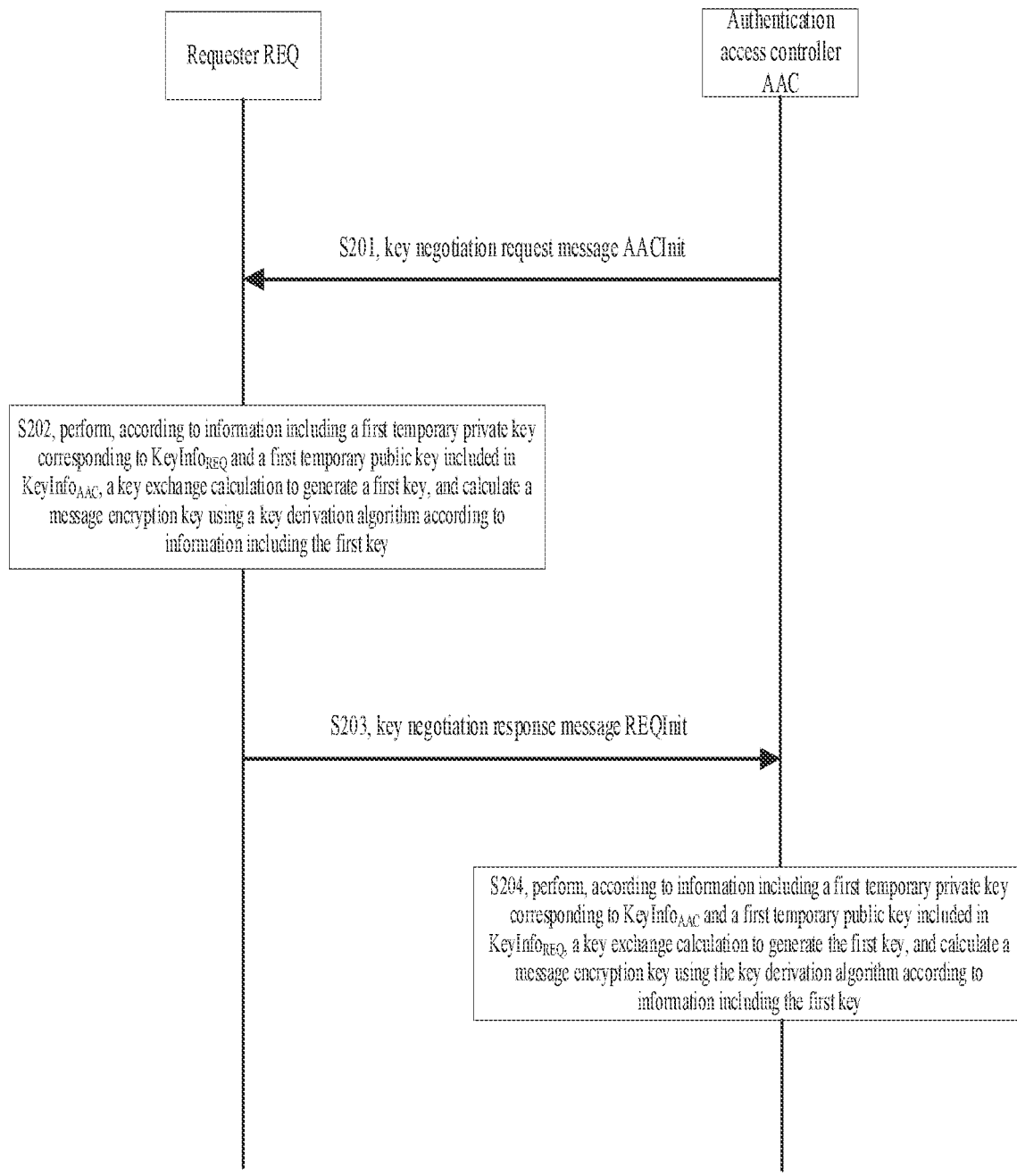

It should be noted that in practical applications, the identity ciphertext of the verified party may be sent by the verified party to the verifying party, and then the identity ciphertext of the verifying party may be sent by the verifying party to the verified party, as in the above-mentioned embodiment corresponding to FIG. 1-1. Of course, referring to FIG. 1-2, it is also possible that the identity ciphertext of the verifying party is sent by the verifying party to the verified party, and then the identity ciphertext of the verified party is sent by the verified party to the verifying party. FIG. 1-2 shows an embodiment of an identity authentication method. The method comprises the following operations.

S101', a verified party receives identity ciphertext of a verifying party sent by a verifying party.

S102', the verified party decrypts the identity ciphertext of the verifying party to obtain the identity of the verifying party.

S103', the verifying party receives identity ciphertext of the verified party sent by the verified party.

S104', the verifying party decrypts the identity ciphertext of the verified party to obtain the identity of the verified party.

S105', the verified party determines, according to the identity of the verifying party, a key pre-shared with the verifying party, and calculates an identity authentication code of the verified party using the pre-shared key.

S106', the verifying party receives the identity authentication code of the verified party sent by the verified party.

S107', the verifying party determines, according to the identity of the verified party, a key pre-shared with the verified party, and checks the received identity authentication code of the verified party using the pre-shared key to obtain a check result.

S108', the verifying party determines, according to the check result, an identity authentication result of the verified party.

It should be noted that in the embodiment of FIG. 1-2, the verified party may also send the identity ciphertext of the verified party and the identity authentication code of the verified party to the verifying party by means of the same message. In this case, the operation of S105' will be moved to S102' for execution, and correspondingly, the operation of S106' will be moved to S103' for execution.

Optionally, in a scenario in which mutual identity authentication is performed between the REQ and the AAC, if REQ and AAC mutually determine that the identity of the other party is legitimate, then REQ and AAC may also update the pre-shared key (PSK) used in a next identity authentication.

For example, the REQ and the AAC may each calculate the pre-shared key used in the next identity authentication by using the key derivation algorithm according to information including a pre-shared key (PSK) currently used by the two parties or according to information including an IAK currently used by the two parties.

Regardless of the mutual identity authentication for the REQ and the AAC, or the unilateral identity authentication on the REQ, or the unilateral identity authentication on the AAC, the REQ and the AAC may also calculate a session key for ensuring subsequent confidential communication between the REQ and the AAC when the verifying party determines that the identity of the verified party is legitimate.

For example, both the REQ and the AAC calculate, according to information including the identity of the two parties, the session key for ensuring subsequent confidential communication between the REQ and the AAC, and the session key may include a data encryption key and/or a data integrity check key.

Illustratively, when the REQ calculates the session key, the REQ may calculate, according to information including the identity $ID_{REQ}$ of the REQ and the identity $ID_{AAC}$ of the AAC and other information (other information used by the REQ and the AAC is the same and optional, such as a specific character string, etc.), the session key for ensuring subsequent confidential communication by using the key derivation algorithm.

When the AAC calculates the session key, the AAC calculates, according to information including the identity $ID_{AAC}$ of the AAC and the identity $ID_{REQ}$ of the REQ and other information (other information used by the AAC and the REQ is the same and optional, such as a specific character string, etc.), the session key for ensuring subsequent confidential communication by using the key derivation algorithm.

As can be seen from the above-described technical solutions, when the requester and the authentication access controller perform identity authentication using the authentication mechanism of the pre-shared key, the identity information of the entities is transmitted in the form of ciphertext, thereby preventing the identity information of the entities from being exposed during the transmission, so that an attacker cannot obtain private or sensitive information. The mutual or unilateral identity authentication between the authentication access controller and the requester is achieved while ensuring the confidentiality of the entity identity and related information, thereby laying a foundation for ensuring that the user accessing the network is legitimate and/or the network accessed by the user is legitimate.

Since the message encryption key in the above-mentioned embodiment may be obtained by negotiation between the REQ and the AAC, a method for negotiating a message encryption key between the REQ and the AAC is further provided in the embodiment of the present application. Referring to FIG. 2, the method further comprises:

S201, the AAC sends a key negotiation request message AACInit to the REQ.

A first key exchange parameter $Keyinfo_{AAC}$ of the AAC is included in the AACInit, and the $KeyInfo_{AAC}$ includes a first temporary public key of the AAC. The key exchange refers to a key exchange algorithm such as Diffie-Hellman (DH). A first nonce $Nonce_{AAC}$ generated by the AAC is also included in the AACInit.

The AACInit may further include Security capabilities$_{AAC}$. The Security capabilities$_{AAC}$ represents security capability parameter information supported by the AAC, including an identity authentication suite (the identity authentication suite including one or more identity authentication methods), one or more symmetric encryption algorithms, one or more key exchange algorithms, one or more integrity check algorithms and/or one or more key derivation algorithms, etc., supported by the AAC, so as to select a specific security policy used by the REQ. Then, the REQ may select, according to the Security capabilities$_{AAC}$, the specific security policy Security capabilities$_{REQ}$ used by the REQ. The Security capabilities$_{REQ}$ represents an identity authentication method, a symmetric encryption algorithm, a key exchange algorithm, an integrity check algorithm, and/or a key derivation algorithm, etc., which are correspondingly determined by the REQ to use.

S202, the REQ performs, according to information including a first temporary private key corresponding to a first key exchange parameter $KeyInfo_{REQ}$ of the REQ and a first temporary public key included in the $KeyInfo_{AAC}$, a key exchange calculation to generate a first key, and uses, according to information including the first key, the key derivation algorithm to calculate a message encryption key.

The $KeyInfo_{REQ}$ includes a first temporary public key of the REQ, and the first temporary private key corresponding to the $KeyInfo_{REQ}$ is a temporary private key generated by the REQ corresponding to the first temporary public key of the REQ, that is, the first temporary public key of the REQ and the first temporary private key corresponding to the $KeyInfo_{REQ}$ are a pair of temporary public and private keys.

If the $Nonce_{AAC}$ generated by the AAC is also included in the AACInit, the REQ may calculate, according to information including the first temporary private key corresponding to the $KeyInfo_{REQ}$, the first temporary public key included in the $KeyInfo_{AAC}$, the $Nonce_{AAC}$, and a second nonce $Nonce_{REQ}$ generated by the REQ, the message encryption key by using a negotiated or pre-configured key derivation algorithm. The negotiated key derivation algorithm may be a key derivation algorithm selected for use by the REQ according to the Security capabilities$_{AAC}$ sent by the AAC. Illustratively; the REQ may perform a key exchange calculation according to information including the first temporary private key corresponding to the $KeyInfo_{REQ}$ and the first temporary public key included in the $KeyInfo_{AAC}$ to obtain a first key K1, and then, according to the K1, the $Nonce_{AAC}$, the $Nonce_{REQ}$, and other information (other information used by the AAC and the REQ is the same and optional, such as a specific character string, etc.), the REQ may calculate the message encryption key by using the key derivation algorithm.

S203, the REQ sends a key negotiation response message REQInit to the AAC.

The $KeyInfo_{REQ}$ is included in the REQInit, so that the AAC calculates, according to the information including the first temporary private key corresponding to the $KeyInfo_{AAC}$ and the first temporary public key included in the $KeyInfo_{REQ}$, the message encryption key. The first temporary private key corresponding to the $KeyInfo_{AAC}$ is a temporary private key generated by the AAC corresponding to the first temporary public key of the AAC, that is, the first temporary public key of the AAC and the first temporary private key corresponding to the $KeyInfo_{AAC}$ are a pair of temporary public and private keys. The Security capabilities$_{REQ}$ may also be included in the REQInit.

The $Nonce_{REQ}$ may also be included in the REQInit, so that the AAC calculates, according to the information including the first temporary private key corresponding to the $KeyInfo_{AAC}$, the first temporary public key included in the $KeyInfo_{REQ}$, the $Nonce_{AAC}$ and the $Nonce_{REQ}$, the message encryption key.

The $Nonce_{AAC}$ may also be included in the REQInit, and then the AAC may verify the consistency of the $Nonce_{AAC}$ in the REQInit and the $Nonce_{AAC}$ generated by the AAC before calculating the message encryption key, so as to ensure that the REQInit received by the AAC is a response message to the AACInit.

S204, the AAC performs, according to information including a first temporary private key corresponding to the $KeyInfo_{AAC}$ and a first temporary public key included in the $Keyinfo_{REQ}$, a key exchange calculation to generate the first key, and uses, according to information including the first key, the key derivation algorithm to calculate a message encryption key.

If the Nonce$_{REQ}$ is also included in the REQInit, the AAC may calculate, according to the information including the first temporary private key corresponding to the KeyInfo$_{AC}$, the first temporary public key included in the KeyInfo$_{REQ}$, the Nonce$_{AAC}$ and the Nonce$_{REQ}$, the message encryption key by using a negotiated or pre-configured key derivation algorithm. The negotiated key derivation algorithm may be a key derivation algorithm selected for use by the AAC according to the Security capabilities$_{REQ}$ sent by the REQ. Illustratively, the AAC may perform a key exchange calculation according to information including the first temporary private key corresponding to the KeyInfo$_{AAC}$ and the first temporary public key included in the KeyInfo$_{REQ}$ to obtain a first key K1, and then, according to the K1, the Nonce$_{AAC}$, the Nonce$_{REQ}$ and other information (other information used by the AAC and the REQ is the same and optional, such as a specific character string, etc.), the AAC may calculate the message encryption key by using the key derivation algorithm.

It should be noted that in the embodiment of FIG. 2, the AAC and the REQ may also generate a message integrity check key. The implementation means in which the REQ and the AAC each generate the message integrity check key is the same as the implementation means in which the REQ and the AAC each generate the message encryption key illustrated in the embodiment of FIG. 2. For example, the AAC may use the key derivation algorithm to derive a string of key data by means of the embodiment in FIG. 2, wherein the key data may be used not only as the message encryption key but also as the message integrity check key, or, a part of the key data is used as the message encryption key and another part of the key data is used as the message integrity check key. The AAC may also use the key derivation algorithm to derive two strings of the same or different key data in stages by means of the embodiment in FIG. 2, wherein one string is used as the message encryption key, and the other string is used as the message integrity check key. The REQ may use the key derivation algorithm to derive a string of key data by means of the embodiment in FIG. 2, wherein the key data may be used not only as the message encryption key but also as the message integrity check key, or, a part of the key data is used as the message encryption key and another part of the key data is used as the message integrity check key. The REQ may also use the key derivation algorithm to derive two strings of the same or different key data in stages by means of the embodiment in FIG. 2, wherein one string is used as the message encryption key, and the other string is used as the message integrity check key.

When any one party of the AAC and the REQ serves as the verified party, the verified party uses the message integrity check key generated thereby to perform a calculation on fields, other than a message integrity check code, in a message carrying the message integrity check code sent by the verified party to generate the message integrity check code of the verified party, and sends the message integrity check code to the verifying party. Correspondingly, after the verifying party receives the message integrity check code of the verified party sent by the verified party, the verifying party uses the message integrity check key generated by itself to verify the message integrity check code of the verified party, and if the verification succeeds, the verifying party performs related steps.

Illustratively, there are two implementation manners for the verifying party to calculate the identity authentication code of the verified party.

In one implementation manner, the verified party determines, according to the identity of the verifying party, the pre-shared key (PSK) pre-shared with the verifying party, and uses, according to information including the PSK and a first key, a key derivation algorithm to calculate an identity authentication key (IAK). The first key is obtained by the verified party performing a key exchange calculation according to information including the first temporary private key corresponding to the first key exchange parameter of the verified party and the first temporary public key included in the first key exchange parameter of the verifying party. The verified party uses the IAK to perform a calculation on first specified information of the verified party to generate the identity authentication code of the verified party, wherein the first specified information of the verified party includes the identity of the verified party.

When the verified party is the REQ and the verifying party is the AAC, the REQ determines, according to ID$_{AAC}$, the pre-shared key (PSK) pre-shared with the AAC, and uses, according to the information including the PSK and the first key K1, the key derivation algorithm to calculate the identity authentication key (IAK). Optionally, the REQ may also use the key derivation algorithm to calculate the IAK according to the PSK, the K1, and other information (other information used by the AAC and the REQ is the same and optional, such as a specific character string, etc.). Then, the REQ uses the IAK to perform a calculation on the first specified information of the REQ interacting between the REQ and the AAC by using an integrity check algorithm to generate the identity authentication code MIC$_{REQ}$ of the REQ, where the first specified information of the REQ includes the identity ID$_{REQ}$ of the REQ.

The first key K1 is obtained by the REQ performing a key exchange calculation according to the information including the first temporary private key corresponding to the first key exchange parameter KeyInfo$_{REQ}$ of the REQ and the first temporary public key KeyInfo$_{AAC}$ included in the first key exchange parameter of the AAC.

Optionally, when a second key exchange parameter KeyInfo$_{REQ\_second}$ of the REQ is present, the KeyInfo$_{REQ\_second}$ may also be included in the first specified information of the REQ, that is, the REQ may use the IAK to perform a calculation on information including the ID$_{REQ}$ and the KeyInfo$_{REQ\_second}$, by using an integrity check algorithm to generate the MIC$_{REQ}$. The KeyInfo$_{REQ\_second}$ is a result of an XOR operation of the information including the second temporary public key generated by the REQ and the hash value of the IAK; or, the KeyInfo$_{REQ\_second}$ is a result of an XOR operation of the information including the second temporary public key generated by the REQ and an extended identity authentication key (EIAK), where the EIAK is generated by the REQ performing a calculation by using a key derivation algorithm according to information including the IAK and other information (other information used by the AAC and the REQ is the same and optional, such as a specific character string, etc.).

When the verified party, is the AAC and the verifying party is the REQ, the AAC determines, according to ID$_{REQ}$, the pre-shared key (PSK) pre-shared with the REQ, and uses the key derivation algorithm to calculate the identity authentication key (IAK) according to the information including the PSK and the first key K1. Optionally, the AAC may also use the key derivation algorithm to calculate the IAK according to the PSK, the K1, and other information (other information used by the AAC and the REQ is the same and optional, such as a specific character string, etc.). Then, the AAC uses the IAK to perform a calculation on first specified information of the AAC interacting between the REQ and the AAC by using an integrity check algorithm to generate the identity authentication code $MIC_{AAC}$ of the AAC, where the first specified information of the REQ includes the identity $ID_{AAC}$ of the AAC.

The first key K1 is obtained by the AAC performing a key exchange calculation according to the information including the first temporary private key corresponding to the first key exchange parameter $KeyInfo_{AAC}$ of the AAC and the first temporary public key included in the first key exchange parameter $KeyInfo_{REQ}$ of the REQ.

Optionally, when a second key exchange parameter $KeyInfo_{AAC\_second}$ of the AAC is present, the $KeyInfo_{AAC\_second}$ may also be included in the first specified information of the AAC, that is, the AAC may use the IAK to perform a calculation on information including the $ID_{AAC}$ and the $KeyInfo_{AAC\_second}$ by using an integrity check algorithm to generate the $MIC_{AAC}$. The $KeyInfo_{AAC\_second}$ is a result of an XOR operation of the information including the second temporary public key generated by the AAC and the hash value of the IAK; or, the $KeyInfo_{AAC\_second}$ is a result of an XOR operation of the information including the second temporary public key generated by the AAC and an extended identity authentication key (EIAK), where the EIAK is generated by the AAC performing a calculation by using a key derivation algorithm according to information including the IAK and other information (other information used by the AAC and the REQ is the same and optional, such as a specific character string, etc.).

In another implementation manner, the verified party uses, according to the information including the key pre-shared with the verifying party, the key derivation algorithm to calculate the identity authentication key (IAK), and uses the IAK to perform a calculation on second specified information of the verified party to generate an identity authentication code of the verified party, where the identity of the verified party and a first key K1 are included in the second specified information of the verified party, and the first key is obtained by the verified party performing a key exchange calculation according to information including the first temporary private key corresponding to the first key exchange parameter of the verified party and the first temporary public key included in the first key exchange parameter of the verifying party.

When the verified party is the REQ and the verifying party is the AAC, the REQ determines, according to $ID_{AAC}$, the pre-shared key (PSK) pre-shared with the AAC, and uses, according to the information including the PSK, the key derivation algorithm to calculate the identity authentication key (IAK). Optionally, the REQ may also use the key derivation algorithm to calculate the IAK according to the PSK and other information (other information used by the AAC and the REQ is the same and optional, such as a specific character string, etc.). Then, the REQ uses the IAK to perform a calculation on second specified information of the REQ interacting between the REQ and the AAC by using an integrity check algorithm to generate the identity authentication code $MIC_{REQ}$ of the REQ, where the second specified information of the REQ includes the identity $ID_{REQ}$ of the REQ and the first key K1.

Optionally, when a second key exchange parameter $KeyInfo_{REQ\_second}$ of the REQ is present, the $KeyInfo_{REQ\_second}$ may also be included in the second specified information of the REQ, that is, the REQ may use the IAK to perform a calculation on information including the $ID_{REQ}$, the K1 and the $KeyInfo_{REQ\_second}$ by using an integrity check algorithm to generate the $MIC_{REQ}$.

When the verified party is the AAC and the verifying party is the REQ, the AAC determines, according to $ID_{REQ}$, the pre-shared key (PSK) pre-shared with the REQ, and uses, according to the information including the PSK, the key derivation algorithm to calculate the identity authentication key (IAK). Optionally, the AAC may also use the key derivation algorithm to calculate the IAK according to the PSK and other information (other information used by the AAC and the REQ is the same and optional, such as a specific character string, etc.). Then, the AAC uses the IAK to perform a calculation on second specified information of the AAC interacting between the REQ and the AAC by using an integrity check algorithm to generate the identity authentication code $MIC_{AAC}$ of the AAC, where the second specified information of the AAC includes the identity $ID_{AAC}$ of the AAC and the first key K1.

Optionally, when a second key exchange parameter $KeyInfo_{AAC\_second}$ of the AAC is present, the $KeyInfo_{AAC\_second}$ may also be included in the second specified information of the AAC, that is, the AAC may use the IAK to perform a calculation on information including the $ID_{AAC}$, the K1, and the $KeyInfo_{AAC\_second}$ by using an integrity check algorithm to generate the $MIC_{AAC}$.

Illustratively, implementation manners in which the REQ and the AAC calculate the pre-shared key (PSK) used in the next identity authentication include the following two implementation manners.

In one implementation manner, the REQ and the AAC each calculate the pre-shared key used in the next identity authentication by using the key derivation algorithm according to information including the first key K1 generated thereby and the pre-shared keys (PSK) of the two parties.

Illustratively, the REQ calculates the pre-shared key (PSK) used in the next identity authentication by using the key derivation algorithm according to the pre-shared key (PSK) pre-shared with the AAC, the first key K1 generated thereby, and other information (other information used by the AAC and the REQ is the same and optional, such as a specific character string, etc.).

The AAC calculates the pre-shared key (PSK) used in the next identity authentication by using the key derivation algorithm according to the pre-shared key (PSK) pre-shared with the REQ, the first key K1 generated thereby, and other information (other information used by the AAC and the REQ is the same and optional, such as a specific character string, etc.).

In another embodiment, when the REQ and the AAC mutually determine that the identity of the other party is legitimate, and the REQ and the AAC mutually receive the second key exchange parameter of the other party, the REQ and the AAC each calculate the pre-shared key used in the next identity authentication by using the key derivation algorithm according to a second key K2 generated thereby and the identity authentication key (IAK). The second key K2 generated by one party is obtained by the one party performing a key exchange calculation according to information including a second temporary private key corresponding to the second key exchange parameter thereof and a second temporary public key restored from a second key exchange parameter of the other party. The second temporary private key corresponding to the second key exchange parameter $KeyInfo_{REQ\_second}$ of the REQ is a temporary private key generated by the REQ corresponding to the second temporary public key of the REQ, that is, the second temporary public key of the REQ and the second temporary private key corresponding to the KeyInfo$_{REQ\_second}$ are a pair of temporary public and private keys. The second temporary private key corresponding to the second key exchange parameter KeyInfo$_{AAC\_second}$ of the AAC is a temporary private key generated by the AAC corresponding to the second temporary public key of the AAC, that is, the second temporary public key of the AAC and the second temporary private key corresponding to the KeyInfo$_{AAC\_second}$ are a pair of temporary public and private keys.

Illustratively, the REQ calculates an identity authentication key (IAK) by using a key derivation algorithm according to the pre-shared key (PSK) pre-shared with the AAC, the first key K1 generated by itself, and other information (other information used by the AAC and the REQ is the same and optional, such as a specific character string, etc.), and then calculates the pre-shared key (PSK) used in the next identity authentication by using the key derivation algorithm according to information including the second key K2 generated by itself and the IAK.

The AAC calculates an identity authentication key (IAK) by using a key derivation algorithm according to the pre-shared key (PSK) pre-shared with the REQ, the first key K1 generated by itself, and other information (other information used by the AAC and the REQ is the same and optional, such as a specific character string, etc.), and then calculates the pre-shared key (PSK) used in the next identity authentication by using the key derivation algorithm according to information including the second key K2 generated by itself and the IAK.

Illustratively, implementation manners in which the REQ and the AAC calculate the session key used for subsequent confidential communication between the REQ and the AAC include the following two implementation manners. The session key may include a data encryption key and/or a data integrity check key. For example, the AAC may calculate a string of key data by the following manners. The key data may be used as the data encryption key and/or the data integrity check key, or, a part of the key data may be used as the data encryption key, and another part of the key data may be used as the data integrity check key. Alternatively, the AAC may also use a key derivation algorithm to derive two strings of the same or different key data in stages, where one string is used as the data encryption key, and the other string is used as the data integrity check key. Correspondingly, the REQ may calculate a string of key data by the following manners. The key data may be used as the data encryption key and/or the data integrity check key, or, a part of the key data may be used as the data encryption key, and another part of the key data may be used as the data integrity check key. Alternatively, the REQ may also use a key derivation algorithm to derive two strings of the same or different key data in stages, where one string is used as the data encryption key, and the other string is used as the data integrity check key.

In one implementation manner, the REQ and the AAC each calculate the session key according to information including the first key K I generated thereby and the identity of the two parties.

Illustratively, when the REQ calculates the session key, the REQ may calculate, according to information including the first key K1 generated by the REQ, the identity ID$_{REQ}$ of the REQ, and the identity ID$_{AAC}$ of the AAC and other information (other information used by the REQ and the AAC is the same and optional, such as a specific character string, etc.), the session key for ensuring subsequent confidential communication by using the key derivation algorithm.

When the AAC calculates the session key, the AAC calculates, according to information including the first key K1 generated by the AAC, the identity ID$_{REQ}$ of the REQ, and the identity ID$_{AAC}$ of the AAC and other information (other information used by the AAC and the REQ is the same and optional, such as a specific character string, etc.), the session key for ensuring subsequent confidential communication by using the key derivation algorithm.

In another implementation manner, when the REQ and the AAC mutually receive the second key exchange parameter of the other party, the REQ and the AAC each calculate the session key according to information including the second key K2 generated thereby and the identity of the two parties.

Illustratively, when the REQ calculates the session key, the REQ may calculate, according to information including the second key K2 generated by the REQ, the identity ID$_{REQ}$ of the REQ, and the identity ID$_{AAC}$ of the AAC and other information (other information used by the REQ and the AAC is the same and optional, such as a specific character string, etc.), the session key for ensuring subsequent confidential communication by using the key derivation algorithm.

When the AAC calculates the session key, the AAC may calculate, according to information including the second key K2 generated by the AAC, the identity ID$_{REQ}$ of the REQ, and the identity ID$_{AAC}$ of the AAC and other information (other information used by the AAC and the REQ is the same and optional, such as a specific character string, etc.), the session key for ensuring subsequent confidential communication by using the key derivation algorithm.

Based on the foregoing embodiments, an identity authentication method provided in an embodiment of the present application will be described below from the cases of both mutual identity authentication and unilateral identity authentication. For the case of unilateral identity authentication, two identify authentication methods of unilateral authentication for the REQ and unilateral authentication for the AAC are provided in the embodiment.

Figure 3:
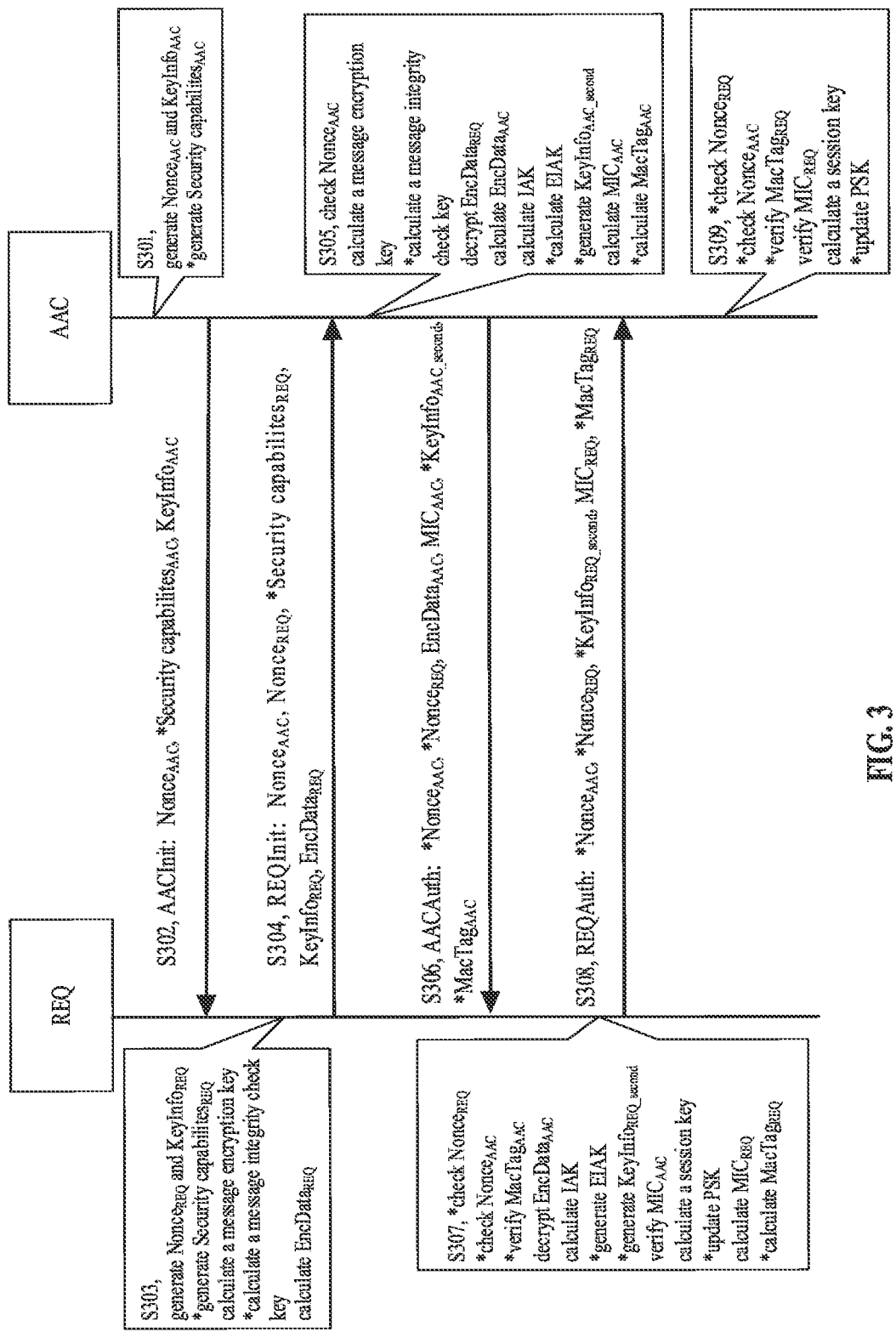
FIG. 3 is a schematic diagram of a mutual identity authentication method provided in an embodiment of the present application, wherein "*" represents an optional field or an optional operation.

Referring to FIG. 3, same is an identity authentication method of mutual identity authentication for the REQ and the AAC. The method comprises the following operations.

S301, the AAC generates Nonce$_{AAC}$ and KeyInfo$_{AAC}$, and generates Security capabilities$_{AAC}$ as needed.

S302, the AAC sends a key negotiation request message AACInit to the REQ.

The Nonce$_{AAC}$, the Security capabilities$_{AAC}$ and the KeyInfo$_{AAC}$ are included in the AACInit. The Security capabilities$_{AAC}$ is an optional field, which represents security capability parameter information supported by the AAC, including an identity authentication suite, one or more symmetric encryption algorithms, one or more key exchange algorithms, one or more integrity check algorithms, and/or one or more key derivation algorithms, etc., supported by the AAC (the same for the full text).

S303, the REQ generates Nonce$_{REQ}$ and KeyInfo$_{REQ}$, generates Security capabilities$_{RE}$ as needed, performs a key exchange calculation according to information including the first temporary private key corresponding to the KeyInfo$_{REQ}$ and the first temporary public key included in the KeyInfo$_{AAC}$ to obtain a first key K1, combines the K1 with the Nonce$_{AAC}$, the Nonce$_{REQ}$, and other information (other information used by the AAC and the REQ is the same and optional, such as a specific character string, etc.) to calculate a message encryption key and a message integrity check key by using a negotiated or pre-configured key derivation algorithm, and uses the message encryption key to calculate the identity ciphertext $EncData_{REQ}$ of the REQ by using a symmetric encryption algorithm.

The Security capabilities$_{REQ}$ represents the selection of a specific security policy made by the REQ according to the Security capabilities$_{AAC}$, that is, the identity authentication method, the symmetric encryption algorithm, the key exchange algorithm, the integrity check algorithm and/or the key derivation algorithm, etc., determined by the REQ to use (the same for the full text). Calculating the message integrity check key by the REQ is an optional operation, which may be performed later when same needs to be used.

S304, the REQ sends a key negotiation response message REQInit to the AAC.

$Nonce_{AAC}$, $Nonce_{REQ}$, Security capabilities$_{REQ}$, $KeyInfo_{REQ}$, and $EncData_{REQ}$ are included in the REQInit. The Security capabilities$_{REQ}$ is an optional field, and whether REQ generates the Security capabilitie$_{REQ}$ depends on whether the Security capabilities$_{AAC}$ is carried in the AACInit sent by the AAC to the REQ. The $Nonce_{AAC}$ should be equal to a corresponding field in the AACInit, and the to-be-encrypted data of $EncData_{REQ}$ includes $ID_{REQ}$. In an embodiment of the present application, a to-be-encrypted object is referred to as to-be-encrypted data.

S305, the AAC receives the REQInit, and then performs the following operations (unless otherwise specified or logically related, the actions numbered (1), (2), . . . herein do not have a necessary sequence because of the numbers, the same for the full text), including the following operations.

(1), Whether the $Nonce_{AAC}$ in the REQInit is the same as the $Nonce_{AAC}$ generated by the AAC is checked; and if $Nonce_{AAC}$ in the REQInit and the $Nonce_{AAC}$ generated by the AAC are different, discarding the REQInit.

(2), A key exchange calculation is performed according to information including the first temporary private key corresponding to the $KeyInfo_{AAC}$ and the first temporary public key included in the $KeyInfo_{REQ}$ to obtain a first key K1, and the K1 is combined with the $Nonce_{AAC}$, the $Nonce_{REQ}$ and other information (other information used by the AAC and the REQ is the same and optional, such as a specific character string, etc.) to calculate a message encryption key and a message integrity check key by using a key derivation algorithm.

Calculating the message integrity check key by the AAC is an optional operation, which may be performed later when same needs to be used.

(3), The message encryption key is used to decrypt the $EncData_{REQ}$ to obtain $ID_{REQ}$.

(4), Identity ciphertext $EncData_{AAC}$ of the AAC is calculated.

(5), A pre-shared key (PSK) pre-shared with the REQ is determined according to the $ID_{REQ}$ obtained by decryption, and the PSK is combined with the first key K1 calculated by the AAC and other information (other information used by the AAC and the REQ is the same and optional, such as a specific character string, etc.) to calculate an identity authentication key (IAK) by using the key derivation algorithm.

(6), Information including the IAK and other information (other information used by the AAC and the REQ is the same and optional, such as a specific character string, etc.) is used as needed to calculate an EIAK by using a key derivation algorithm.

(7), A second key exchange parameter $KeyInfo_{AAC\_second}$ is generated as needed.

(8), The IAK is used to calculate an identity authentication code $MIC_{AAC}$ of the AAC by using an integrity check algorithm.

(9), A message integrity check code $MacTag_{AAC}$ is calculated as needed.

S306, the AAC sends an identity authentication request message AACAuth to the REQ.

The $Nonce_{AAC}$, the $Nonce_{REQ}$, the $EncData_{AAC}$, the $MIC_{AAC}$, the $KeyInfo_{AAC\_second}$, and the $MacTag_{AAC}$ are included in the AACAuth. The $Nonce_{REQ}$, the $Nonce_{AAC}$, the $KeyInfo_{AAC\_second}$, and the $MacTag_{AAC}$ are optional fields, and the $Nonce_{REQ}$ and the $Nonce_{AAC}$ should be equal to the $Nonce_{REQ}$ in the REQInit and the $Nonce_{AAC}$ generated by the AAC, respectively. The to-be-encrypted data of the $EncData_{AAC}$ includes $ID_{AAC}$. The $MIC_{AAC}$ is obtained by the AAC using the IAK generated thereby to perform a calculation on message data by using an integrity check algorithm. The message data includes the $ID_{AAC}$ and the $Nonce_{AAC}$. When the $KeyInfo_{AAC\_second}$ is present, the message data also includes the $KeyInfo_{AAC\_second}$. The $KeyInfo_{AAC\_second}$ is a result of an XOR operation of information including the second temporary public key generated by the AAC and the EIAK. The calculation process of the $MacTag_{AAC}$ is: using a message integrity check key to perform a calculation on fields in the AACAuth other than the $MacTag_{AAC}$ by using an integrity check algorithm to generate the $MacTag_{AAC}$.

S307, the REQ receives the AACAuth, and then performs the following operations.

(1), If the $Nonce_{REQ}$ and/or the $Nonce_{AAC}$ are/is carried in the AACAuth, whether the $Nonce_{REQ}$ is the same as the $Nonce_{REQ}$ generated by the REQ is checked; and/or, whether the $Nonce_{AAC}$ is the same as the $Nonce_{AAC}$ in the AACInit is checked.

(2), If the $MacTag_{AAC}$ is carried in the AACAuth, the $MacTag_{AAC}$ is verified.

The verification process is as follows: the REQ uses the message integrity check key to locally perform a calculation on fields, other than the $MacTag_{AAC}$, in the AACAuth by using an integrity check algorithm to obtain the $MacTag_{AAC}$ (this calculation means is the same as the means of calculating the $MacTag_{AAC}$ by the AAC), and compares the calculated $MacTag_{AAC}$ with the received $MacTag_{AAC}$ in the AACAuth.

(3), The message encryption key is used to decrypt the $EncData_{AAC}$ by using a symmetric encryption algorithm to obtain the $ID_{AAC}$.

(4), A pre-shared key (PSK) pre-shared with the AAC is determined according to the $ID_{AAC}$ obtained by decryption, and the PSK is combined with the first key K1 calculated by the REQ and other information (other information used by the REQ and the AAC is the same and optional, such as a specific character string, etc.) to calculate an identity authentication key (IAK) by using the key derivation algorithm.

(5), If the $KeyInfo_{AAC\_second}$ is present in the AACAuth, an extended identity authentication key (EIAK) and a second key exchange parameter $KeyInfo_{REQ\_second}$ are generated by the REQ correspondingly.

(6), If any one of the above-mentioned check and verification steps fails, the AACAuth is discarded immediately; and if both the above-mentioned check and verification succeed, the $MIC_{AAC}$ in the AACAuth is verified.

For example, the REQ uses the IAK generated by itself to locally perform a calculation on message data based on which the $MIC_{AAC}$ is calculated, by using an integrity check algorithm, to obtain the $MIC_{AAC}$, and compares whether the calculated $MIC_{AAC}$ is consistent with the $MIC_{AAC}$ carried in the AACAuth; if the calculated $MIC_{AAC}$ is consistent with the $MIC_{AAC}$ carried in the AACAuth, the verification succeeds, and the identity of the AAC may be determined to be legitimate; if the calculated $MIC_{AAC}$ is inconsistent with the $MIC_{AAC}$ carried in the AACAuth, the verification fails, and the identity of the AAC may be determined to be not legitimate according to the local policy or the authentication process may be terminated.

(7), The session key is calculated and the PSK is updated as needed.

Illustratively, when the $KeyInfo_{REQ\_second}$ and the $KeyInfo_{AAC\_second}$ are not present, the REQ calculates the session key by using the key derivation algorithm according to the K1 calculated by itself, the $Nonce_{AAC}$, the $Nonce_{REQ}$, the $ID_{AAC}$, the $ID_{REQ}$, and other information (other information used by the REQ and the AAC is the same and optional, such as a specific character string, etc.). The session key may include a data encryption key and/or a data integrity check key for ensuring subsequent confidential communication between the REQ and the AAC. Optionally, the REQ combines the K1 calculated by itself with the current PSK to calculate the PSK used in the next identity authentication by using the key derivation algorithm.

When the $KeyInfo_{REQ\_second}$ and the $KeyInfo_{AAC\_second}$ are present, the REQ performs, according to information including a second temporary private key corresponding to the $KeyInfo_{REQ\_second}$ and a second temporary public key restored from the $KeyInfo_{AAC\_second}$, a key exchange calculation to obtain a second key K2, and combines the K2 with the $Nonce_{AAC}$, the $Nonce_{REQ}$, the $ID_{AAC}$, the $ID_{REQ}$, and other information (other information used by the REQ and the AAC is the same and optional, such as a specific character string, etc.) to calculate the session key by using the key derivation algorithm. Optionally, the REQ combines the K2 calculated by itself with the IAK to calculate the PSK used in the next identity authentication by using the key derivation algorithm.

(8), The IAK is used to calculate an identity authentication code $MIC_{REQ}$ of the REQ by using the integrity check algorithm.

(9), A message integrity check code $MacTag_{REQ}$ is calculated as needed.

S308, the REQ sends an identity authentication response message REQAuth to the AAC.

The $Nonce_{AAC}$, the $Nonce_{REQ}$, the $KeyInfo_{REQ\_second}$, the $MIC_{REQ}$, and the $MacTag_{REQ}$ are included in the REQAuth. The $Nonce_{REQ}$, the $Nonce_{AAC}$, the $KeyInfo_{REQ\_second}$, and the $MacTag_{REQ}$ are optional fields, and the $Nonce_{REQ}$ and the $Nonce_{AAC}$ should be equal to the $Nonce_{REQ}$ generated by the REQ and the $Nonce_{AAC}$ in the AACInit, respectively. The $MIC_{REQ}$ is obtained by the REQ using the IAK generated by itself to perform a calculation on message data by using an integrity check algorithm. The message data includes the $ID_{REQ}$ and the $Nonce_{REQ}$. When the $KeyInfo_{REQ\_second}$ is present, the message data also includes the $KeyInfo_{REQ\_second}$. The $KeyInfo_{REQ\_second}$ is a result of an XOR operation of information including the second temporary public key generated by the REQ and the EIAK. The calculation process of the $MacTag_{REQ}$ is: using a message integrity check key to perform a calculation on fields, other than the $MacTag_{REQ}$, in the REQAuth by using an integrity check algorithm to generate the $MacTag_{REQ}$.

S309, the AAC receives the REQAuth, and then performs the following operations.

(1), If the $Nonce_{REQ}$ and/or the $Nonce_{AAC}$ are/is carried in the REQAuth, whether the $Nonce_{REQ}$ is the same as the $Nonce_{REQ}$ in the REQInit is checked; and/or, whether the $Nonce_{AAC}$ is the same as the $Nonce_{AAC}$ generated by the AAC is checked.

(2), If the $MacTag_{REQ}$ is present in the REQAuth, the $MacTag_{REQ}$ is verified.

The verification process is as follows: the AAC uses the message integrity check key to locally perform a calculation on fields, other than the $MacTag_{REQ}$ in the REQAuth by using an integrity check algorithm to obtain the $MacTag_{REQ}$ (the foregoing calculation means is the same as the means of calculating the $MacTag_{REQ}$ by the REQ), and compares the calculated $MacTag_{REQ}$ with the received $MacTag_{REQ}$ in the REQAuth.

(3), If both the above-mentioned check and verification succeed, the $MIC_{REQ}$ is verified; and if any one of the above-mentioned check and verification steps fails, the REQAuth is discarded immediately.

For example, the AAC uses the IAK generated by itself to locally perform a calculation on message data based on which the $MIC_{REQ}$ is calculated, by using an integrity check algorithm, to obtain the $MIC_{REQ}$, and compares whether the calculated $MIC_{REQ}$ is consistent with the $MIC_{REQ}$ carried in the REQAuth; if the calculated $MIC_{REQ}$ is consistent with the $MIC_{REQ}$ carried in the REQAuth, the verification succeeds, and the identity of the REQ may be determined to be legitimate; if the calculated $MIC_{REQ}$ is inconsistent with the $MIC_{REQ}$ carried in the REQAuth, the verification fails, and the identity of the REQ may be determined to be not legitimate according to the local policy or the authentication process may be terminated.

(4), the session key is calculated and the PSK is updated as needed.

Illustratively, when the $KeyInfo_{REQ\_second}$ and the $KeyInfo_{AAC\_second}$ are not present, the AAC calculates the session key by using the key derivation algorithm according to the K1 calculated by itself, the $Nonce_{AAC}$, the $Nonce_{REQ}$, the $ID_{AAC}$, the $ID_{REQ}$, and other information (other information used by the AAC and the REQ is the same and optional, such as a specific character string, etc.). The session key may include a data encryption key and/or a data integrity check key for ensuring subsequent confidential communication between the AAC and the REQ. Optionally, the AAC combines the K1 calculated by itself with the current PSK to calculate the PSK used in the next identity authentication by using the key derivation algorithm.

When the $KeyInfo_{REQ\_second}$ and the $KeyInfo_{AAC\_second}$ are present, the AAC performs, according to information including a second temporary private key corresponding to the $KeyInfo_{AAC\_second}$ and a second temporary public key restored from the $KeyInfo_{REQ\_second}$, a key exchange calculation to obtain a second key K2, and combines the K2 with the $Nonce_{AAC}$, the $Nonce_{REQ}$, the $ID_{AAC}$, the $ID_{REQ}$, and other information (other information used by the AAC and the REQ is the same and optional, such as a specific character string, etc.) to calculate the session key by using the key derivation algorithm. Optionally, the AAC combines the K2 calculated by itself with the IAK to calculate the PSK used in the next identity authentication by using the key derivation algorithm.

Thus, the identity authentication for the AAC and the REQ is achieved in S307 and S309, respectively, that is, the mutual identity authentication for the REQ and the AAC is achieved.

Figure 4:
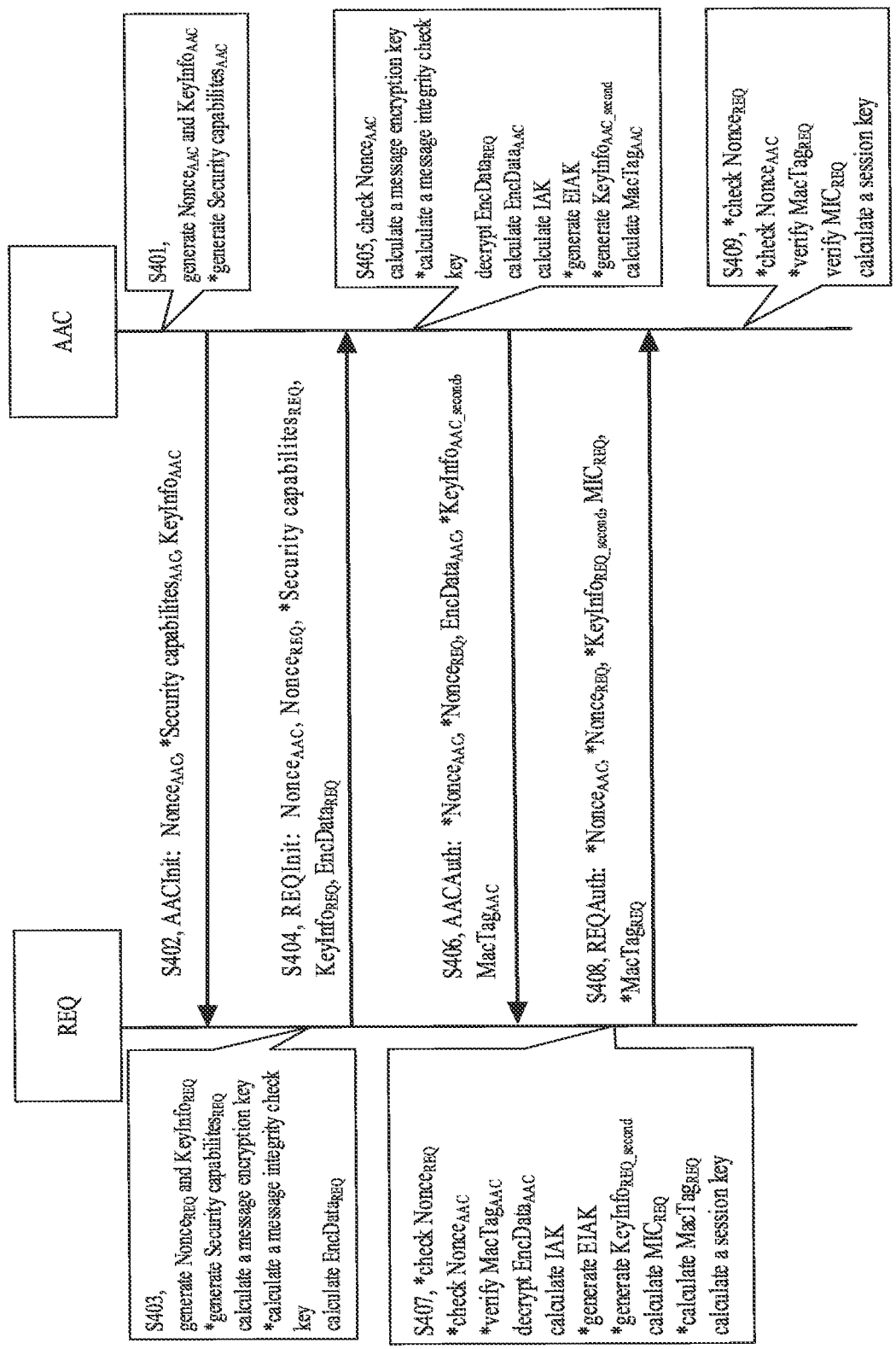
FIG. 4 is a schematic diagram of a unilateral identity authentication method provided in an embodiment of the present application, wherein "*" represents an optional field or an optional operation.

Referring to FIG. 4, same is an identity authentication method of unilateral identity authentication for the REQ. The method comprises the following operations.

S401, the AAC generates $Nonce_{AAC}$ and $KeyInfo_{AAC}$, and generates $Security\ capabilities_{AAC}$ as needed.

S402, the AAC sends a key negotiation request message AACInit to the REQ.

The $Nonce_{AAC}$, the $Security\ capabilities_{AAC}$, and the $KeyInfo_{AAC}$ are included in the AACInit. The $Security\ capabilities_{AAC}$ is an optional field.

S403, the REQ generates $Nonce_{REQ}$ and $KeyInfo_{REQ}$, generates $Security\ capabilities_{REQ}$ as needed, performs a key exchange calculation according to information including the first temporary private key corresponding to the $KeyInfo_{REQ}$ and the first temporary public key included in the $KeyInfo_{AAC}$ to obtain a first key K1, combines the K1 with the $Nonce_{AAC}$, the $Nonce_{REQ}$, and other information (other information used by the REQ and the AAC is the same and optional, such as a specific character string, etc.) to calculate a message encryption key and a message integrity check key by using a negotiated or pre-configured key derivation algorithm, and uses the message encryption key to calculate the identity ciphertext $EncData_{REQ}$ of the REQ by using a symmetric encryption algorithm.

Calculating the message integrity check key by the REQ is an optional operation, which may be performed later when same needs to be used.

S404, the REQ sends a key negotiation response message REQInit to the AAC.

$Nonce_{AAC}$, $Nonce_{REQ}$, $Security\ capabilities_{REQ}$, $KeyInfo_{REQ}$, and $EncData_{REQ}$ are included in the REQInit. The $Security\ capabilities_{REQ}$ is an optional field, and whether the REQ generates the $Security\ capabilities_{REQ}$ depends on whether the $Security\ capabilities_{AAC}$ is carried in the AACInit sent by the AAC to the REQ. The $Nonce_{AAC}$ should be equal to a corresponding field in the AACInit; and the to-be-encrypted data of the $EncData_{REQ}$ includes $ID_{REQ}$.

S405, the AAC receives the REQInit, and then performs the following operations.

(1), whether the $Nonce_{AAC}$ in the REQInit is the same as the $Nonce_{AAC}$ generated by the AAC is checked; and if the $Nonce_{AAC}$ in the REQInit is not the same as the $Nonce_{AAC}$ generated by the AAC, the REQInit is discarded.

(2), A key exchange calculation is performed according to information including the first temporary private key corresponding to the $KeyInfo_{AAC}$ and the first temporary public key included in the $KeyInfo_{REQ}$ to obtain a first key K1, and the K1 is combined with the $Nonce_{AAC}$, the $Nonce_{REQ}$, and other information (other information used by the AAC and the REQ is the same and optional, such as a specific character string, etc.) to calculate a message encryption key and a message integrity check key by using a key derivation algorithm.

Calculating the message integrity check key by the AAC is an optional operation, which may be performed later when same needs to be used.

(3), The message encryption key is used to decrypt the $EncData_{REQ}$ to obtain the $ID_{REQ}$.

(4), Identity ciphertext $EncData_{AAC}$ of the AAC is calculated.

(5), A pre-shared key (PSK) pre-shared with the REQ is determined according to the $ID_{REQ}$ obtained by decryption, and the PSK is combined with the first key K1 calculated by the AAC and other information (other information used by the AAC and the REQ is the same and optional, such as a specific character string, etc.) to calculate an identity authentication key (IAK) by using the key derivation algorithm.

(6), An extended identity authentication key (EIAK) and a second key exchange parameter $KeyInfo_{AAC\_second}$ is generated as needed.

(7), A message integrity check code $MacTag_{AAC}$ is calculated.

S406, the AAC sends an identity authentication request message AACAuth to the REQ.

The $Nonce_{AAC}$, the $Nonce_{REQ}$, the $EncData_{AAC}$, the $KeyInfo_{AAC\_second}$, and the $MacTag_{AAC}$ are included in the AACAuth. The $Nonce_{REQ}$, the $Nonce_{AAC}$, and the $KeyInfo_{AAC\_second}$ are optional fields, and the $Nonce_{REQ}$ and the $Nonce_{AAC}$ should be equal to the $Nonce_{REQ}$ in the REQInit and the $Nonce_{AAC}$ generated by the AAC, respectively. The to-be-encrypted data of $EncData_{AAC}$ includes $ID_{AAC}$. The $KeyInfo_{AAC\_second}$ is a result of an XOR operation of the information including the second temporary public key generated by the AAC and the EIAK, where the EIAK is obtained by the AAC performing a calculation by using a key derivation algorithm according to information including the IAK and other information (other information used by the AAC and the REQ is the same and optional, such as a specific character string, etc.). The calculation process of $MacTag_{AAC}$ is as described in the embodiment of FIG. 3.

S407, the REQ receives the AACAuth, and then performs the following operations.

(1), If the $Nonce_{REQ}$ and/or the $Nonce_{AAC}$ are/is carried in the AACAuth, whether the $Nonce_{REQ}$ is the same as the $Nonce_{REQ}$ generated by the REQ is checked; and/or, whether the $Nonce_{AAC}$ is the same as the $Nonce_{AAC}$ in the AACInit is checked.

(2), The $MacTag_{AAC}$ is verified, where the verification process is as described in the embodiment of FIG. 3.

(3), If any one of the above-mentioned check and verification steps fails, the AACAuth is discarded immediately; and if both the above-mentioned check and verification succeed, the message encryption key is used to decrypt the $EncData_{AAC}$ by using a symmetric encryption algorithm to obtain the $ID_{AAC}$.

(4), A pre-shared key (PSK) pre-shared with the AAC is determined according to the $ID_{AAC}$ obtained by decryption, and the PSK is combined with the first key K1 calculated by the REQ and other information (other information used by the REQ and the AAC is the same and optional, such as a specific character string, etc.) to calculate an identity authentication key (IAK) by using the key derivation algorithm.

(5), If the $KeyInfo_{AAC\_second}$ is present in the AACAuth, an extended identity authentication key (EIAK) and a second key exchange parameter $KeyInfo_{REQ\_second}$ are generated by the REQ correspondingly.

(6), The IAK is used to calculate an identity authentication code $MIC_{REQ}$ of the REQ by using the integrity check algorithm.

(7), A message integrity check code $MacTag_{REQ}$ is calculated as needed; and (8), A session key is calculated.

Illustratively, when the $KeyInfo_{REQ}$ and the $KeyInfo_{AAC}$ s are not present, the REQ calculates the session key by using the key derivation algorithm according to the K1 calculated thereby, the $Nonce_{AAC}$, the $Nonce_{REQ}$, the $ID_{AAC}$, the $ID_{REQ}$, and other information (other information used by the REQ and the AAC is the same and optional, such as a specific character string, etc.). When the $KeyInfo_{REQ\_second}$ and the $KeyInfo_{AAC\_second}$ are present, the REQ performs, according to information including a second temporary private key corresponding to the $KeyInfo_{REQ\_second}$ and a second temporary public key restored from the $KeyInfo_{AAC\_second}$, a key exchange calculation to obtain a second key K2, and combines the K2 with the $Nonce_{AAC}$, the $Nonce_{REQ}$, the $ID_{AAC}$, the $ID_{REQ}$, and other information (other information used by the REQ and the AAC is the same and optional, such as a specific character string, etc.) to calculate the session key by using the key derivation algorithm. The session key may include a data encryption key and/or a data integrity check key for ensuring subsequent confidential communication between the REQ and the AAC.

S408, the REQ sends an identity authentication response message REQAuth to the AAC.

The $Nonce_{AAC}$, the $Nonce_{REQ}$, the $KeyInfo_{REQ\_second}$, the $MIC_{REQ}$, and the $MacTag_{REQ}$ are included in the REQAuth. The $Nonce_{REQ}$, the $Nonce_{AAC}$, the $KeyInfo_{REQ\_second}$, and the $MacTag_{REQ}$ are optional fields, and the $Nonce_{REQ}$ and the $Nonce_{AAC}$ should be equal to the $Nonce_{REQ}$ generated by the REQ and the $Nonce_{AAC}$ in the AACInit, respectively. The $MIC_{REQ}$ is obtained by the REQ using the IAK generated by itself to perform a calculation on message data by using an integrity check algorithm. The message data includes $ID_{REQ}$ and $Nonce_{REQ}$. When the $KeyInfo_{REQ\_second}$ is present, the message data also includes the $KeyInfo_{REQ\_second}$. The $KeyInfo_{REQ\_second}$ is a result of an XOR operation of the information including the second temporary public key generated by the REQ and an EIAK. The EIAK is generated by the REQ performing a calculation by using a key derivation algorithm according to information including the IAK and other information (other information used by the AAC and the REQ is the same and optional, such as a specific character string, etc.). The calculation process of $MacTag_{REQ}$ is as described in the embodiment of FIG. 3.

S409, the AAC receives the REQAuth, and then performs the following operations.

(1), If the $Nonce_{REQ}$ and/or the $Nonce_{AAC}$ are/is carried in the REQAuth, whether the $Nonce_{REQ}$ is the same as the $Nonce_{REQ}$ in the REQInit is checked; and/or, whether the $Nonce_{AAC}$ is the same as the $Nonce_{AAC}$ generated by the AAC is checked.

(2), If the $MacTag_{REQ}$ is present in the REQAuth, the $MacTag_{REQ}$ is verified. The verification process is as described in the embodiment of FIG. 3.

(3), If both the above-mentioned check and verification succeed, the $MIC_{REQ}$ is verified; and if any one of the above-mentioned check and verification steps fails, the REQAuth is discarded immediately.

The verification process of the $MIC_{REQ}$ is as described in the embodiment of FIG. 3. If the verification succeeds, the identity of the REQ may be determined to be legitimate; and if the verification fails, the identity of the REQ may be determined to be not legitimate according to the local policy or the authentication process may be terminated.

(4), A session key is calculated.

Illustratively, when the $KeyInfo_{REQ\_second}$ and the $KeyInfo_{AAC\_second}$ are not present, the AAC calculates the session key by using the key derivation algorithm according to the K1 calculated by itself, the $Nonce_{AAC}$, the $Nonce_{REQ}$, the $ID_{AAC}$, the $ID_{REQ}$, and other information (other information used by the AAC and the REQ is the same and optional, such as a specific character string, etc.). When the $KeyInfo_{REQ\_second}$ w and the $KeyInfo_{AAC\_second}$ are present, the AAC performs, according to information including a second temporary private key corresponding to the $KeyInfo_{AAC\_second}$ and a second temporary public key restored from the $KeyInfo_{REQ\_second}$, a key exchange calculation to obtain a second key K2, and combines the K2 with the $Nonce_{AAC}$, the $Nonce_{REQ}$, the $ID_{AAC}$, the $ID_{REQ}$, and other information (other information used by the AAC and the REQ is the same and optional, such as a specific character string, etc.) to calculate the session key by using the key derivation algorithm. The session key may include a data encryption key and/or a data integrity check key for ensuring subsequent confidential communication between the AAC and the REQ.

Thus, the unilateral identity authentication for the REQ is achieved in S409.

Figure 5:
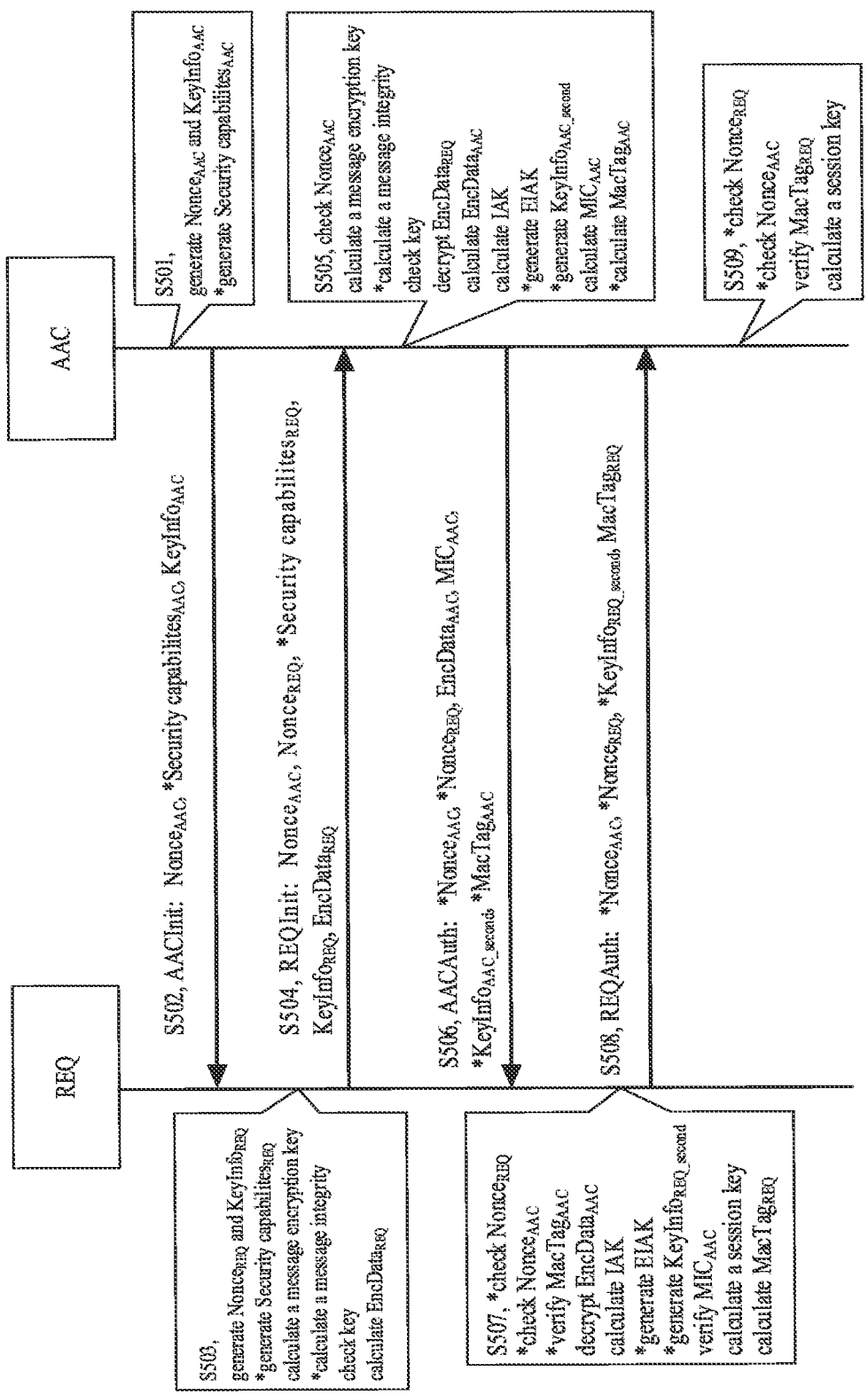
FIG. 5 is a schematic diagram of another unilateral identity authentication method provided in an embodiment of the present application, wherein "*" represents an optional field or an optional operation.

Referring to FIG. 5, same is an identity authentication method of unilateral identity authentication for the AAC. The method comprises the following operations.

S501, the AAC generates $Nonce_{AAC}$ and $KeyInfo_{AAC}$, and generates Security $capabilities_{AAC}$ as needed.

S502, the AAC sends a key negotiation request message AACInit to the REQ.

The $Nonce_{AAC}$, the Security $capabilities_{AAC}$, and the $KeyInfo_{AAC}$ are included in the AACInit. The Security $capabilities_{AAC}$ is an optional field.

S503, the REQ generates $Nonce_{REQ}$ and $KeyInfo_{REQ}$, generates Security $capabilities_{REQ}$ as needed, performs a key exchange calculation according to information including the first temporary private key corresponding to the $KeyInfo_{REQ}$ and the first temporary public key included in the $KeyInfo_{AAC}$ to obtain a first key K1, combines the K1 with the $Nonce_{AAC}$, the $Nonce_{REQ}$, and other information (other information used by the REQ and the AAC is the same and optional, such as a specific character string, etc.) to calculate a message encryption key and a message integrity check key by using a negotiated or pre-configured key derivation algorithm, and uses the message encryption key to calculate the identity ciphertext $EncData_{REQ}$ of the REQ by using a symmetric encryption algorithm.

Calculating the message integrity check key by the REQ is an optional operation, which may be performed later when same needs to be used.

S504, the REQ sends a key negotiation response message REQInit to the AAC.

The $Nonce_{AAC}$, the $Nonce_{REQ}$, the Security $capabilities_{REQ}$, the $KeyInfo_{REQ}$, and the $EncData_{REQ}$ are included in the REQInit. The Security $capabilities_{REQ}$ is an optional field, and whether REQ generates the Security $capabilities_{REQ}$ depends on whether the Security $capabilities_{AAC}$ is carried in the AACInit sent by the AAC to the REQ. The $Nonce_{AAC}$ should be equal to a corresponding field carried in the AACInit; and the to-be-encrypted data of $EncData_{REQ}$ includes $ID_{REQ}$.

S505, the AAC receives the REQInit, and then performs the following operations.

(1), Whether the $Nonce_{AAC}$ in the REQInit is the same as the $Nonce_{AAC}$ generated by the AAC is checked; and if the $Nonce_{AAC}$ in the REQInit is not the same as the $Nonce_{AAC}$ generated by the AAC, the REQInit is discarded.

(2), A key exchange calculation is performed according to information including the first temporary private key corresponding to the $KeyInfo_{AAC}$ and the first temporary public key included in the $KeyInfo_{REQ}$ to obtain a first key K1, and the K1 is combined with the $Nonce_{AAC}$, the $Nonce_{REQ}$, and other information (other information used by the AAC and the REQ is the same and optional, such as a specific character string, etc.) to calculate a message encryption key and a message integrity check key by using a key derivation algorithm. Calculating the message integrity check key by the AAC is an optional operation, which may be performed later when same needs to be used.

(3), The message encryption key is used to decrypt the $EncData_{REQ}$ to obtain $ID_{REQ}$.

(4), Identity ciphertext $EncData_{AAC}$ of the AAC is calculated.

(5), A pre-shared key (PSK) pre-shared with the REQ is determined according to the $ID_{REQ}$ obtained by decryption, and the PSK is combined with the first key K1 calculated by the AAC and other information (other information used by the AAC and the REQ is the same and optional, such as a specific character string, etc.) to calculate an identity authentication key (IAK) by using the key derivation algorithm.

(6), An extended identity authentication key (EIAK) and a second key exchange parameter KeyInfo$_{AAC\_second}$ are generated as needed.

(7), The IAK is used to calculate an identity authentication code MIC$_{AAC}$ of the AAC by using an integrity check algorithm.

(8), A message integrity check code MacTag$_{AAC}$ is calculated as needed.

S506, the AAC sends an identity authentication request message AACAuth to the REQ.

The Nonce$_{AAC}$, the Nonce$_{REQ}$, the EncData$_{AAC}$, the MIC$_{AAC}$, the KeyInfo$_{AAC\_second}$, and the MacTag$_{AAC}$ are included in the AACAuth. The Nonce$_{REQ}$, the Nonce$_{AAC}$, the KeyInfo$_{AAC\_second}$, and the MacTag$_{AAC}$ are optional fields, and the Nonce$_{REF}$ and the Nonce$_{AAC}$ should be equal to the Nonce$_{REQ}$ in the REQInit and the Nonce$_{AAC}$ generated by the AAC, respectively. The Keyinfo$_{AAC\_second}$ is a result of an XOR operation of the information including the second temporary public key generated by the AAC and the EIAK, wherein the EIAK is obtained by the AAC performing a calculation by using a key derivation algorithm according to information including the IAK and other information (other information used by the AAC and the REQ is the same and optional, such as a specific character string, etc.). The MIC$_{AAC}$ is obtained by the AAC using the IAK generated thereby to perform a calculation on message data by using an integrity check algorithm, wherein the message data includes the ID$_{AAC}$ and the Nonce$_{AAC}$. When the KeyInfo$_{AAC\_second}$ is present, the message data also includes the KeyInfo$_{AAC\_second}$.

S507, the REQ receives the AACAuth, and then performs the following operations.

(1), If the Nonce$_{REQ}$ and/or the Nonce$_{AAC}$ are/is carried in the AACAuth, whether the Nonce$_{REQ}$ is the same as the Nonce$_{REQ}$ generated by the REQ is checked; and/or, whether the Nonce$_{AAC}$ is the same as the Nonce$_{AAC}$ in the AACInit is checked.

(2), If the MacTag$_{AAC}$ is present in the AACAuth, the MacTag$_{AAC}$ is verified. The verification process is as described in the embodiment of FIG. 3.

(3), The message encryption key is used to decrypt the EncData$_{AAC}$ by using a symmetric encryption algorithm to obtain the ID$_{AAC}$.

(4), A pre-shared key (PSK) pre-shared with the AAC is determined according to the ID$_{AAC}$ obtained by decryption, and the PSK is combined with the first key K1 calculated by the REQ and other information (other information used by the REQ and the AAC is the same and optional, such as a specific character string, etc.) to calculate an identity authentication key (IAK) by using the key derivation algorithm.

(5), If the KeyInfo$_{AAC\_second}$ is present in the AACAuth, an extended identity authentication key (EIAK) and a second key exchange parameter KeyInfo$_{REQ\_second}$ are generated by the REQ correspondingly.

(6), If any one of the above-mentioned check and verification steps fails, the AACAuth is discarded immediately; and if both the above-mentioned check and verification succeed, the MIC$_{AAC}$ is verified.

The verification process of the MIC$_{AAC}$ is as described in the embodiment of FIG. 3; if the verification succeeds, the identity of the AAC may be determined to be legitimate; and if the verification fails, the identity of the AAC may be determined to be not legitimate according to the local policy or the authentication process may be terminated.

(7), A session key is calculated.

Illustratively, when the KeyInfo$_{REQ\_second}$ and the KeyInfo$_{AAC\_second}$ are not present, the REQ calculates the session key by using the key derivation algorithm according to the K1 calculated by itself, the Nonce$_{AAC}$, the Nonce$_{REQ}$, the ID$_{AAC}$, the IDR, and other information (other information used by the REQ and the AAC is the same and optional, such as a specific character string, etc.). When the KeyInfo$_{REQ\_second}$ and the KeyInfo$_{AAC\_second}$ are present, the REQ performs, according to information including a second temporary private key corresponding to the KeyInfo$_{REQ\_second}$ and a second temporary public key restored from the KeyInfo$_{AAC\_second}$, a key exchange calculation to obtain a second key K2, and combines the K2 with the Nonce$_{AAC}$, the Nonce$_{REQ}$, the ID$_{AAC}$, the ID$_{REQ}$, and other information (other information used by the REQ and the AAC is the same and optional, such as a specific character string, etc.) to calculate the session key by using the key derivation algorithm. The session key may include a data encryption key and/or a data integrity check key for ensuring subsequent confidential communication between the REQ and the AAC.

(8), A message integrity check code MacTag$_{REQ}$ is calculated.

S508, the REQ sends an identity authentication response message REQAuth to the AAC.

The Nonce$_{AAC}$, the Nonce$_{REQ}$, the KeyInfo$_{REQ\_second}$, the MIC$_{REQ}$, and the MacTag$_{REQ}$ are included in the REQAuth. The Nonce$_{REQ}$, the Nonce$_{AAC}$, and the KeyInfo$_{REQ\_second}$ are optional fields, and the Nonce$_{REQ}$ and the Nonce$_{AAC}$ should be equal to the Nonce$_{REQ}$ generated by the REQ and the Nonce$_{AAC}$ in the AACInit, respectively. The KeyInfo$_{REQ\_second}$ is a result of an XOR operation of the information including the second temporary public key generated by the REQ and the EIAK, where the EIAK is obtained by the REQ performing a calculation by using a key derivation algorithm according to information including the IAK and other information (other information used by the AAC and the REQ is the same and optional, such as a specific character string, etc.). The calculation process of MacTag$_{REQ}$ is as described in the embodiment of FIG. 3.

S509, the AAC receives the REQAuth, and then performs the following operations.

(1), If the Nonce$_{REQ}$ and/or the Nonce$_{AAC}$ are/is carried in the REQAuth, whether the Nonce$_{REQ}$ is the same as the Nonce$_{REQ}$ in the REQInit is checked; and/or, whether the Nonce$_{AAC}$ is the same as the Nonce$_{AAC}$ generated by the AAC is checked.

(2), The MacTag$_{REQ}$ is verified by using the message integrity check key. The verification process is as described in the embodiment of FIG. 3.

(3), If both the above-mentioned check and verification succeed, the session key is calculated; and if any one of the above-mentioned check and verification steps fails, the REQAuth is discarded immediately.

Illustratively, when the KeyInfo$_{REQ\_second}$ and the KeyInfo$_{AAC\_second}$ are not present, the AAC calculates the session key by using the key derivation algorithm according to the K1 calculated by itself, the Nonce$_{AAC}$, the Nonce$_{REQ}$, the ID$_{AAC}$, the ID$_{REQ}$, and other information (other information used by the AAC and the REQ is the same and optional, such as a specific character string, etc.). When the KeyInfo$_{REQ\_second}$ and the KeyInfo$_{AAC\_second}$ are present, the AAC performs, according to information including a second temporary private key corresponding to the Key- Info$_{AAC\_second}$ and a second temporary public key restored from the KeyInfo$_{REQ\_second}$, a key exchange calculation to obtain a second key K2, and combines the K2 with the Nonce$_{AAC}$, the Nonce$_{REQ}$, the ID$_{AAC}$, the ID$_{REQ}$, and other information (other information used by the AAC and the REQ is the same and optional, such as a specific character string, etc.) to calculate the session key by using the key derivation algorithm. The session key may include a data encryption key and/or a data integrity check key for ensuring subsequent confidential communication between the AAC and the REQ.

Thus, the unilateral identity authentication for the AAC is achieved in S507.

In each of the above embodiments, each message may also carry a hash value HASH$_X$. The hash value HASH$_X$ is obtained by sender entity X of the message using a hash algorithm to perform a calculation on the received latest preceding message sent by peer entity Y, and is used by peer entity Y to verify whether entity X has received the complete latest preceding message. If X represents the REQ. Y correspondingly represents the AAC, and if X represents the AAC, Y correspondingly represents the REQ. HASH$_{REQ}$ represents a hash value calculated by the REQ on the received latest preceding message sent by the AAC, and HASH$_{AAC}$ represents a hash value calculated by the AAC on the received latest preceding message sent by the REQ. If a message currently sent by sender entity X is a first message interacting between entity X and entity Y, it means that entity X has not received a preceding message sent by peer entity Y, then the HASH$_X$ in the message may not exist or is meaningless.

Correspondingly, after peer entity Y receives a message sent by entity X, if HASH$_X$ is included in the message, when entity Y has not sent the preceding message to entity X, entity Y will ignore the HASH$_X$; and when entity Y has sent the preceding message to entity X, entity Y will calculate a hash value of the latest preceding message previously sent to entity X locally by using a hash algorithm, and compare the hash value with the HASH$_X$ carried in the received message. If they are consistent, subsequent steps will be performed, otherwise the authentication process will be discarded or terminated.

In the present invention, for entity X, the preceding message sent by peer entity Y to entity X refers to a message sent by peer entity Y to entity X and received by the entity X before entity X sends message M to peer entity Y, and the latest preceding message sent by peer entity Y to entity X refers to a latest message sent by peer entity Y to entity X and received by the entity X before entity X sends message M to peer entity Y. If message M sent by entity X to peer entity Y thereof is a first message for interaction between entity X and entity Y, there is no preceding message sent by peer entity Y to entity X before entity X sends message M to peer entity Y thereof.

It should be noted that the optional fields and optional operations in the corresponding embodiments of FIGS. 3, 4, and 5 described above are denoted by "*" in FIGS. 3, 4, and 5 of the drawings. The order of the contents included in the message involved in all the above embodiments is not limited, and unless otherwise specified, there is no limitation on the order in which the message receiver operates on related messages and processes the contents included in the messages after receiving the messages.

Figure 6:
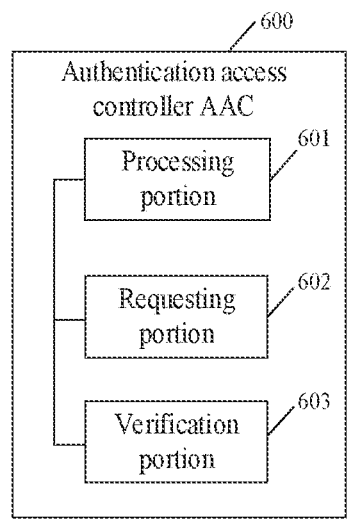
FIG. 6 is a structural block diagram of an authentication access controller (AAC) provided in an embodiment of the present application.

Based on the method embodiments corresponding to FIGS. 1 to 5, referring to FIG. 6, an authentication access controller 600 is further provided in an embodiment of the present application, and comprises a processing portion 601 and a requesting portion 602.

The processing portion 601 is configured to receive identity ciphertext of a requester sent by the requester, and to decrypt the identity ciphertext of the requester to obtain the identity of the requester. The identity ciphertext of the requester is generated by the requester using a message encryption key to encrypt information including the identity of the requester.

The requesting portion 602 is configured to send identity ciphertext of the authentication access controller to the requester, wherein the identity ciphertext of the authentication access controller is generated by the authentication access controller using the message encryption key to encrypt information including the identity of the authentication access controller.

When the authentication access controller serves as a verified party, the requesting portion 602 is further configured to send an identity authentication code of the authentication access controller to the requester, the identity authentication code of the authentication access controller is calculated to generated by the authentication access controller according to a key pre-shared with the requester; and/or when the authentication access controller serves as a verifying party, the authentication access controller further comprises: a verification portion 603, configured to receive the identity authentication code of the requester sent by the requester, to determine, according to the identity of the requester, the key pre-shared with the requester, to check the received identity authentication code of the requester by using the key pre-shared with the requester, and to determine, according to a check result, an identity authentication result of the requester.

Optionally, the authentication access controller further comprises a sending portion and a calculating portion.

The sending portion is configured to send a key negotiation request message to the requester, a first key exchange parameter of the authentication access controller being included in the key negotiation request message.

The processing portion 601 is further configured to receive a key negotiation response message sent by the requester, a first key exchange parameter of the requester being included in the key negotiation response message.

The calculating portion is configured to perform, according to information including a first temporary private key corresponding to the first key exchange parameter of the authentication access controller and a first temporary public key included in the first key exchange parameter of the requester, a key exchange calculation to generate a first key, and to calculate the message encryption key according to information including the first key.

Optionally, a first nonce generated by the authentication access controller is further included in the key negotiation request message sent by the sending portion, and correspondingly, a second nonce generated by the requester is further included in the key negotiation response message received by the processing portion 601.

Then, the calculating portion is further configured to calculate the message encryption key according to information including the first key, the first nonce, and the second nonce.

Optionally, the first nonce is further included in the key negotiation response message received by the processing portion 601, and then the processing portion 601 is further configured to perform consistency verification of the first nonce in the key negotiation response message and the first nonce generated by the authentication access controller.

Optionally, security capability parameter information supported by the authentication access controller is further included in the key negotiation request message sent by the sending portion, and then a specific security policy used by the requester, which is determined by the requester according to the security capability parameter information, is further included in the key negotiation response message received by the processing portion 601.

Optionally, the requesting portion 602 is further configured to: use a message integrity check key to perform a calculation on fields, other than a message integrity check code of the authentication access controller, in a sent message carrying the message integrity check code of the authentication access controller to generate the message integrity check code of the authentication access controller; and send the message integrity check code of the authentication access controller to the requester, the message integrity check key and the message encryption key being generated by the same manner.

Optionally, the verification portion 603 is further configured to: receive a message integrity check code of the requester sent by the requester and verify the message integrity check code of the requester by using the message integrity check key, the message integrity check key and the message encryption key being generated by the same manner.

Optionally, the requesting portion 602 is further configured to: calculate, according to information including a key pre-shared with the requester and the first key, an identity authentication key by using a key derivation algorithm, use the identity authentication key to perform a calculation on first specified information of the authentication access controller to generate an identity authentication code of the authentication access controller, and send the identity authentication code of the authentication access controller to the requester, the first specified information of the authentication access controller including the identity of the authentication access controller; or, calculate, according to information including the key pre-shared with the requester, an identity authentication key by using a key derivation algorithm, use the identity authentication key to perform a calculation on second specified information of the authentication access controller to generate an identity authentication code of the authentication access controller, and send the identity authentication code of the authentication access controller to the requester, the second specified information of the authentication access controller including the identity of the authentication access controller and the first key.

Optionally, when the authentication access controller determines that the identity of the requester is legitimate, the authentication access controller further comprises a first calculating portion The first calculating portion is configured to calculate, according to information including the first key and the pre-shared key, a pre-shared key used in a next identity authentication, by using a key derivation algorithm.

Optionally, the authentication access controller receives a second key exchange parameter of the requester, the second key exchange parameter of the requester being generated by the requester performing an encryption calculation, by using the identity authentication key, on information including a second temporary public key generated by the requester itself, and the authentication access controller further comprises a second calculating portion.

The second calculating portion is configured to perform, according to information including a second temporary private key corresponding to a second key exchange parameter of the authentication access controller and a second temporary public key restored from the second key exchange parameter of the requester, a key exchange calculation to generate a second key.

Optionally, when the authentication access controller determines that the identity of the requester is legitimate, the authentication access controller further comprises a third calculating portion.

The third calculating portion is configured to calculate a pre-shared key used in the next identity authentication by using a key derivation algorithm according to the second key and the identity authentication key.

Optionally, when the authentication access controller determines that the identity of the requester is legitimate, the authentication access controller further comprises a fourth calculating portion.

The fourth calculating portion is configured to calculate a session key for subsequent confidential communication according to information including the first key and the respective identities of the authentication access controller and the requester.

Optionally, when the authentication access controller determines that the identity of the requester is legitimate, the authentication access controller further comprises a fifth calculating portion.

The fifth calculating portion is configured to calculate a session key for subsequent confidential communication according to information including the second key and the respective identities of the authentication access controller and the requester.

Optionally, the message sent by the authentication access controller to the requester further include a hash value calculated by the authentication access controller on the received latest preceding message sent by the requester.

Figure 7:
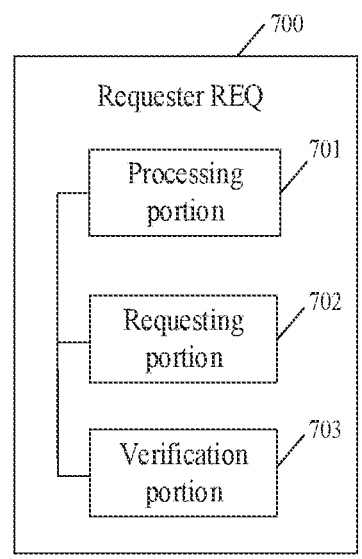
FIG. 7 is a structural block diagram of a requester (REQ) provided in an embodiment of the present application.

Referring to FIG. 7, a requester 700 is further provided in an embodiment of the present application, and comprises a processing portion 701 and a requesting portion 702.

The processing portion 701 is configured to receive identity ciphertext of an authentication access controller sent by the authentication access controller, and to decrypt the identity ciphertext of the authentication access controller to obtain the identity of the authentication access controller, wherein the identity ciphertext of the authentication access controller is generated by the authentication access controller using a message encryption key to encrypt information including the identity of the authentication access controller.

The requesting portion 702 is configured to send identity ciphertext of the requester to the authentication access controller, wherein the identity ciphertext of the requester is generated by the requester using the message encryption key to encrypt information including the identity of the requester.

When the requester serves as a verified party, the requesting portion 702 is further configured to send an identity authentication code of the requester to the authentication access controller, the identity authentication code of the requester being generated by the requester according to a key pre-shared with the authentication access controller; and/or when the requester serves as a verifying party, the requester further comprises: a verification portion 703, configured to receive the identity authentication code of the authentication access controller sent by the authentication access controller, to determine, according to the identity of the authentication access controller, the key pre-shared with the authentication access controller, to check the received identity authentication code of the authentication access controller by using the key pre-shared with the authentication access controller, and to determine, according to a check result, an identity authentication result of the authentication access controller.

Optionally, the requester further comprises a receiving portion and a calculating portion.

The receiving portion is configured to receive a key negotiation request message sent by the authentication access controller, a first key exchange parameter of the authentication access controller being included in the key negotiation request message.

The calculating portion is configured to perform, according to information including a first temporary private key corresponding to the first key exchange parameter of the requester and a first temporary public key included in the first key exchange parameter of the authentication access controller, a key exchange calculation to generate a first key, and to calculate the message encryption key according to information including the first key.

The requesting portion 702 is further configured to send a key negotiation response message to the authentication access controller, a first key exchange parameter of the requester being included in the key negotiation response message.

Optionally, a first nonce generated by the authentication access controller is included in the key negotiation request message received by the receiving portion, and then, the calculating portion is further configured to calculate the identity encryption key according to information including the first key, the first nonce, and a second nonce generated by the requester, and correspondingly, the second nonce is further included in the key negotiation response message sent by the requesting portion 702.

Optionally, security capability parameter information supported by the authentication access controller is included in the key negotiation request message received by the receiving portion, and the requester further comprises a determining portion.

The determining portion is configured to determine a specific security policy used by the requester according to the security capability parameter information; and then the specific security policy is further included in the key negotiation response message sent by the requesting portion 702.

Optionally, the requesting portion 702 is further configured to: use a message integrity check key to perform a calculation on fields, other than a message integrity check code of the requester, in a sent message carrying the message integrity check code of the requester to generate the message integrity check code of the requester, and send the message integrity check code of the requester to the authentication access controller, the message integrity check key and the message encryption key being generated by the same manner.

Optionally, the verification portion 703 is further configured to: receive a message integrity check code of the authentication access controller sent by the authentication access controller and verify the message integrity check code of the authentication access controller by using the message integrity check key, the message integrity check key and the message encryption key being generated by the same manner.

Optionally, the requesting portion 702 is further configured to calculate, according to information including a key pre-shared with the authentication access controller and the first key, an identity authentication key by using a key derivation algorithm, use the identity authentication key to perform a calculation on first specified information of the requester to generate an identity authentication code of the requester, and send the identity authentication code of the requester to the authentication access controller, the first specified information of the requester including the identity of the requester; or, calculate, according to information including the key pre-shared with the authentication access controller, an identity authentication key by using a key derivation algorithm, use the identity authentication key to perform a calculation on second specified information of the requester to generate an identity authentication code of the requester, and send the identity authentication code of the requester to the authentication access controller, the second specified information of the requester including the identity of the requester and the first key.

Optionally, when the requester determines that the identity of the authentication access controller is legitimate, the requester further comprises a first calculating portion.

The first calculating portion is configured to calculate, according to information including the first key and the pre-shared key, a pre-shared key used in a next identity authentication, by using a key derivation algorithm.

Optionally, the requester receives a second key exchange parameter of the authentication access controller, the second key exchange parameter of the authentication access controller being generated by the authentication access controller performing an encryption calculation, by using the identity authentication key, on information including a second temporary public key generated thereby, and the requester further comprising a second calculating portion.

The second calculating portion is configured to perform, according to information including a second temporary private key corresponding to a second key exchange parameter of the requester and a second temporary public key restored from the second key exchange parameter of the authentication access controller, a key exchange calculation to generate a second key.

Optionally, when the requester determines that the identity of the authentication access controller is legitimate, the requester further comprises a third calculating portion.

The third calculating portion is configured to calculate a pre-shared key used in the next identity authentication by using a key derivation algorithm according to the second key and the identity authentication key.

Optionally, when the requester determines that the identity of the authentication access controller is legitimate, the requester further comprises a fourth calculating portion.

The fourth calculating portion is configured to calculate a session key for subsequent confidential communication according to information including the first key and the respective identities of the authentication access controller and the requester.

Optionally, when the requester determines that the identity of the authentication access controller is legitimate, the requester further comprises a fifth calculating portion.

The fifth calculating portion is configured to calculate a session key for subsequent confidential communication according to information including the second key and the respective identities of the authentication access controller and the requester.

Optionally, the message sent by the requester to the authentication access controller further include a hash value calculated by the requester on the received latest preceding message sent by the authentication access controller.

When the authentication access controller and the requester described above are used to perform the identity authentication method provided in the embodiment of the present application, and the requester and the authentication access controller perform identity authentication by using the authentication mechanism of the pre-shared key, the identity information of the entities is transmitted in the form of ciphertext, thereby preventing the identity information of the entities from being exposed during the transmission, so that an attacker cannot obtain private or sensitive information. Moreover, the verifying party can obtain the identity information of an entity by decrypting the identity ciphertext of the entity, so as to achieve the true identity authentication for the verified party. The mutual or unilateral identity authentication between the authentication access controller and the requester is achieved while ensuring the confidentiality of the entity identity and related information, thereby laying a foundation for ensuring that the user accessing the network is legitimate and/or the network accessed by the user is legitimate.

It should be noted that in the embodiments of the present application and other embodiments, the word "portion" may be a partial circuit, a partial processor, a partial program, software, etc. Of course, same may also be a unit, or may also be either modular or non-modular.

Figure 8:
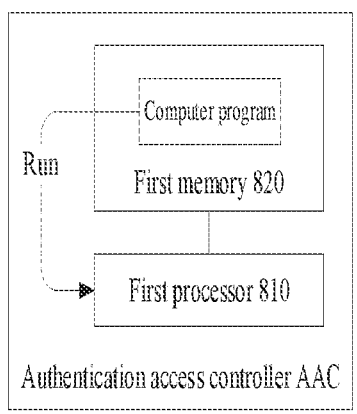
FIG. 8 is a block diagram of a hardware structure of an authentication access controller (AAC) provided in an embodiment of the present application.

Referring to FIG. 8, an authentication access controller (AAC) is further provided in an embodiment of the present application, and comprises: a first processor 810 and a first memory 820. The first processor 810 may invoke and run a computer program from the first memory 820 to implement the steps performed by the AAC in the above-mentioned embodiments.

The first memory 820 may be one separate component independent of the first processor 810, or may be integrated in the first processor 810.

It should be understood that the authentication access controller may implement the respective processes implemented by the AAC in various methods of the embodiments of the present application, which are not described herein again for brevity.

Figure 9:
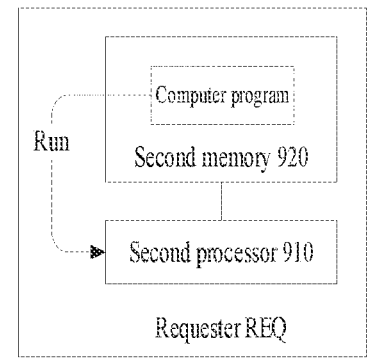
FIG. 9 is a block diagram of a hardware structure of a requester (REQ) provided in an embodiment of the present application.

Referring to FIG. 9, a requester (REQ) is further provided in an embodiment of the present application, and comprises: a second processor 910 and a second memory 920. The second processor 910 may invoke and run a computer program from the second memory 920 to implement the steps performed by the REQ in the above-mentioned embodiments.

The second memory 920 may be one separate component independent of the second processor 910, or may be integrated in the second processor 910.

It should be understood that the requester may implement the respective processes implemented by the REQ in various methods of the embodiments of the present application, which are not described herein again for brevity.

A computer-readable storage medium is further provided in an embodiment of the present application. The computer-readable storage medium stores thereon a computer program that, when run by a processor, performs the steps performed by the authentication access controller (AAC) or the requester (REQ) in the identity authentication method described above. The storage medium may be a volatile or non-volatile computer-readable storage medium.

It should be noted that the storage medium may be at least one of a read-only memory (ROM), a RAM, a magnetic or optical disk, and other media that can store program codes.

A computer program is further provided in an embodiment of the present application. The computer program comprises a computer-readable code, wherein when the computer-readable code is run in a computer device, a processor in the computer device performs the steps performed by the authentication access controller (AAC) or the requester (REQ) in the identity authentication method described above.

A computer program product is further provided in an embodiment of the present application. The computer program product comprises computer program instructions, which may be used to perform the steps performed by the authentication access controller (AAC) or the requester (REQ) in the identity authentication method described above. Please refer to the above-mentioned method embodiments for details, which are not described herein again.

It should be noted that various embodiments in the description are described in a progressive manner, the same and similar parts of each embodiment can be referred to each other, and each embodiment focuses on the differences from other embodiments. In particular, for device and system embodiments, since they are consistent and corresponding to the method embodiments, they are relatively simply described, and please refer to part of the description of the method embodiments for related parts. The device and system embodiments described above are only illustrative, wherein the parts described as separate components may or may not be physically separated, and the components displayed as parts may or may not be physical parts, that is, same may be located in one place, or may be distributed to a plurality of network parts. A part or all of the modules may be selected according to actual needs to achieve the objective of the solutions of the present embodiments. A person of ordinary skill in the art can understand and implement the solutions without any inventive effort.

The detailed description of the present application is merely described above, but the scope of protection of the present application is not limited thereto. Any person skilled in the art can easily conceive of changes or substitutions within the technical scope disclosed in the present application, and all of the changes or substitutions should be covered by the scope of protection of the present application. Therefore, the scope of protection of the present application should be defined by the scope of protection of the claims.

INDUSTRIAL APPLICABILITY

In the identity authentication method provided in the embodiments of the present application, when the requester and the authentication access controller perform identity authentication using the authentication mechanism of the pre-shared key, the identity information of the entities is transmitted in the form of ciphertext during the process of transmitting the messages, thereby preventing the identity information of the entities from being exposed during the transmission, so that attackers cannot obtain private or sensitive information. The mutual or unilateral identity authentication between the authentication access controller and the requester is achieved while ensuring the confidentiality of the entity identity and related information, thereby laying a foundation for ensuring that the user accessing the network is legitimate and/or the network accessed by the user is legitimate.

The invention claimed is:

1. An identity authentication method, wherein one party of a requester and an authentication access controller serves as a verified party, and the other party serves as a corresponding verifying party, the method comprising:
 sending, by the verifying party, an identity ciphertext of the verifying party to the verified party, then decrypting, by the verified party, the identity ciphertext of the verifying party to obtain an identity of the verifying party; and sending, by the verified party, an identity ciphertext of the verified party to the verifying party, then decrypting, by the verifying party, the identity ciphertext of the verified party to obtain an identity of the verified party, wherein the identity ciphertext of the verifying party is generated by the verifying party using a message encryption key to encrypt information comprising the identity of the verifying party, and the identity ciphertext of the verified party is generated by the verified party using the message encryption key to encrypt information comprising the identity of the verified party;

determining, by the verified party, according to the identity of the verifying party, a key pre-shared between the verifying party and the verified party; and determining, by the verifying party, according to the identity of the verified party, the key pre-shared between the verifying party and the verified party;

calculating, by the verified party, an identity authentication code of the verified party by using the key pre-shared between the verifying party and the verified party;

receiving, by the verifying party, the identity authentication code of the verified party sent by the verified party;

checking, by the verifying party, the received identity authentication code of the verified party by using the key pre-shared between the verifying party and the verified party; and determining, by the verifying party, an identity authentication result of the verified party according to a check result.

2. The method according to claim 1, wherein the message encryption key is generated by negotiation between the requester and the authentication access controller, comprising:

sending, by the authentication access controller, a key negotiation request message to the requester, the key negotiation request message comprising a first key exchange parameter of the authentication access controller;

performing, by the requester according to information comprising a first temporary private key corresponding to a first key exchange parameter of the requester and a first temporary public key comprised in the first key exchange parameter of the authentication access controller, a key exchange calculation to generate a first key;

calculating, by the requester, the message encryption key according to information comprising the first key;

sending, by the requester, a key negotiation response message to the authentication access controller, the key negotiation response message comprising the first key exchange parameter of the requester;

performing, by the authentication access controller according to information comprising a first temporary private key corresponding to the first key exchange parameter of the authentication access controller and a first temporary public key comprised in the first key exchange parameter of the requester, a key exchange calculation to generate a first key; and calculating, by the authentication access controller, the message encryption key according to information comprising the first key.

3. The method according to claim 2, wherein the key negotiation request message further comprises a first nonce generated by the authentication access controller;

calculating, by the requester, the message encryption key according to the information comprising the first key, comprises:

calculating, by the requester, the message encryption key according to information comprising the first key, the first nonce, and a second nonce generated by the requester;

correspondingly, the key negotiation response message further comprises the second nonce;

calculating, by the authentication access controller, the message encryption key according to the information comprising the first key, comprises:

calculating, by the authentication access controller, the message encryption key according to information comprising the first key, the first nonce, and the second nonce.

4. The method according to claim 3, wherein the key negotiation response message further comprises the first nonce, and before calculating, by the authentication access controller, the message encryption key according to the information comprising the first key, the method further comprises:

performing, by the authentication access controller, consistency verification of the first nonce in the key negotiation response message and the first nonce generated by the authentication access controller.

5. The method according to claim 2, wherein before checking, by the verifying party, the received identity authentication code of the verified party by using the key pre-shared between the verifying party and the verified party, the method further comprises:

using, by the verified party, a message integrity check key to perform a calculation on fields, other than a message integrity check code of the verified party, in a message carrying the message integrity check code of the verified party sent by the verified party to generate the message integrity check code of the verified party;

receiving, by the verifying party, the message integrity check code of the verified party sent by the verified party;

verifying, by the verifying party, the message integrity check code of the verified party by using the message integrity check key; and if the verification succeeds, performing, by the verifying party, predetermined steps, wherein negotiation means of the message integrity check key and the message encryption key are the same.

6. The method according to claim 2, wherein calculating, by the verified party, the identity authentication code of the verified party by using the key pre-shared between the verifying party and the verified party comprises;

calculating, by the verified party according to information comprising the key pre-shared between the verifying party and the verified party and the first key, an identity authentication key by using a key derivation algorithm; and using, by the verified party, the identity authentication key to perform a calculation on first specified information of the verified party to generate the identity authentication code of the verified party, the first specified information of the verified party comprising the identity of the verified party; or, calculating, by the verified party according to information comprising the key pre-shared between the verifying party and the verified party, an identity authentication key by using a key derivation algorithm; and using, by the verified party, the identity authentication key to perform a calculation on second specified information of the verified party to generate the identity authentication code of the verified party, the second specified information of the verified party comprising the identity of the verified party and the first key.

7. The method according to claim 6, wherein the method further comprises:
   receiving, by the requester, a second key exchange parameter of the authentication access controller, wherein the second key exchange parameter of the authentication access controller is generated by performing an encryption calculation, by using the identity authentication key, on information comprising a second temporary public key generated by the authentication access controller;
   receiving, by the authentication access controller, a second key exchange parameter of the requester, wherein the second key exchange parameter of the requester is generated by performing an encryption calculation, by using the identity authentication key, on information comprising a second temporary public key generated by the requester;
   performing, by the requester, a key exchange calculation according to information comprising a second temporary private key corresponding to its own second key exchange parameter and a second temporary public key restored from the second key exchange parameter of the authentication access controller, to obtain a second key; and
   performing, by the authentication access controller, a key exchange calculation according to information comprising a second temporary private key corresponding to its own second key exchange parameter and a second temporary public key restored from the second key exchange parameter of the requester to obtain the second key.

8. The method according to claim 7, wherein the requester serves as a verified party and the authentication access controller serves as a corresponding verifying party, and the authentication access controller serves as a verified party and the requester serves as a corresponding verifying party; and then, when the requester and the authentication access controller mutually determine that the identity of the other party is legitimate, a method for calculating a pre-shared key used in a next identity authentication comprises:
   using, by the requester and the authentication access controller, respectively, according to the second key and the identity authentication key, the key derivation algorithm to calculate the pre-shared key used in the next identity authentication.

9. The method according to claim 7, wherein when the requester determines that the identity of the authentication access controller is legitimate, and/or when the authentication access controller determines that the identity of the requester is legitimate, the method further comprises:
   calculating, by both the requester and the authentication access controller according to information comprising the second key and respective identities of two parties, a session key for subsequent confidential communication.

10. The method according to claim 1, wherein a message sent by the requester to the authentication access controller further comprises a hash value calculated by the requester for a received latest preceding message sent by the authentication access controller, and the method further comprises:
    upon receiving the message sent by the requester, verifying, by the authentication access controller, the hash value in the received message first, and performing a subsequent operation after verification succeeds;
    wherein a message sent by the authentication access controller to the requester further comprises a hash value calculated by the authentication access controller for a received latest preceding message sent by the requester, and the method further comprises:
    upon receiving the message sent by the authentication access controller, verifying, by the requester, the hash value in the received message first, and performing a subsequent operation after verification succeeds.

11. An authentication access controller, comprising:
    a first processor; and
    a first memory for storing instructions executable by the first processor;
    wherein the first processor is configured to invoke instructions stored by the first memory, so as to perform an identity authentication method comprising:
    receiving identity ciphertext of a requester sent by the requester, and decrypting the identity ciphertext of the requester to obtain an identity of the requester, wherein the identity ciphertext of the requester is generated by the requester using a message encryption key to encrypt information comprising the identity of the requester;
    sending identity ciphertext of the authentication access controller to the requester, wherein the identity ciphertext of the authentication access controller is generated by the authentication access controller using the message encryption key to encrypt information comprising the identity of the authentication access controller;
    wherein when the authentication access controller serves as a verified party, the identity authentication method further comprises: sending an identity authentication code of the authentication access controller to the requester, the identity authentication code of the authentication access controller being generated by the authentication access controller calculating according to a key pre-shared with the requester; and/or when the authentication access controller serves as a verifying party, the identity authentication method further comprises: receiving an identity authentication code of the requester sent by the requester, determining, according to the identity of the requester, the key pre-shared with the requester, to check the received identity authentication code of the requester by using the key pre-shared with the requester, and determining, according to a check result, an identity authentication result of the requester.

12. A requester, comprising:
    a second memory for storing instructions executable by the second processor;
    wherein the second processor is configured to invoke instructions stored by the second memory, so as to perform an identity authentication method comprising:
    receiving identity ciphertext of an authentication access controller sent by the authentication access controller, and decrypting the identity ciphertext of the authentication access controller to obtain an identity of the authentication access controller, wherein the identity ciphertext of the authentication access controller is generated by the authentication access controller using a message encryption key to encrypt information comprising the identity of the authentication access controller;
    sending identity ciphertext of the requester to the authentication access controller, wherein the identity ciphertext of the requester is generated by the requester using the message encryption key to encrypt information comprising the identity of the requester;

wherein when the requester serves as a verified party, the identity authentication method further comprises: sending an identity authentication code of the requester to the authentication access controller, the identity authentication code of the requester being generated by the requester calculating according to a key pre-shared with the authentication access controller; and/or when the requester serves as a verifying party, the identity authentication method further comprises: receiving an identity authentication code of the authentication access controller sent by the authentication access controller, determining, according to the identity of the authentication access controller, the key pre-shared with the authentication access controller, to check the received identity authentication code of the authentication access controller by using the key pre-shared with the authentication access controller, and determining, according to a check result, an identity authentication result of the authentication access controller.

13. The requester according to claim 12, wherein the identity authentication method further comprises:

receiving a key negotiation request message sent by the authentication access controller, the key negotiation request message comprising a first key exchange parameter of the authentication access controller;

performing, according to information comprising a first temporary private key corresponding to the first key exchange parameter of the requester and a first temporary public key comprised in the first key exchange parameter of the authentication access controller, a key exchange calculation to generate a first key, and calculating, according to information comprising the first key, the message encryption key; and wherein the identity authentication method further comprises: sending a key negotiation response message to the authentication access controller, the key negotiation response message comprising a first key exchange parameter of the requester.

14. The requester according to claim 13, wherein the key negotiation request message received by the receiving portion further comprises a first nonce generated by the authentication access controller;

and the identity authentication method further comprises:
calculating the message encryption key according to information comprising the first key, the first nonce, and a second nonce generated by the requester;

correspondingly, the key negotiation response message sent by the requesting portion further comprises the second nonce.

15. The requester according to claim 13, wherein the identity authentication method further comprises: using a message integrity check key to perform a calculation on fields, other than a message integrity check code of the requester, in a sent message carrying the message integrity check code of the requester, to generate the message integrity check code of the requester, and sending the message integrity check code of the requester to the authentication access controller; wherein the message integrity check key and the message encryption key are generated by a same manner.

16. The requester according to claim 13, wherein the identity authentication method further comprises: receiving a message integrity check code of the authentication access controller sent by the authentication access controller and verifying the message integrity check code of the authentication access controller by using a message integrity check key; wherein the message integrity check key and the message encryption key are generated by a same manner.

17. The requester according to claim 13, wherein the identity authentication method further comprises:

calculating, according to information comprising the key pre-shared with the authentication access controller and the first key, an identity authentication key by using a key derivation algorithm, using the identity authentication key to perform a calculation on first specified information of the requester to generate an identity authentication code of the requester, and sending the identity authentication code of the requester to the authentication access controller, the first specified information of the requester comprising the identity of the requester; or, calculating, according to information comprising the key pre-shared with the authentication access controller, an identity authentication key by using a key derivation algorithm, using the identity authentication key to perform a calculation on second specified information of the requester to generate an identity authentication code of the requester, and sending the identity authentication code of the requester to the authentication access controller, the second specified information of the requester comprising the identity of the requester and the first key.

18. The requester according to claim 17, wherein the requester receives a second key exchange parameter of the authentication access controller, the second key exchange parameter of the authentication access controller is generated by the authentication access controller performing an encryption calculation, by using the identity authentication key, on information comprising a second temporary public key generated by the authentication access controller itself, and the identity authentication method further comprises:

performing, according to information comprising a second temporary private key corresponding to a second key exchange parameter of the requester and a second temporary public key restored from the second key exchange parameter of the authentication access controller, a key exchange calculation to obtain a second key.

19. The requester according to claim 18, wherein when the requester determines that the identity of the authentication access controller is legitimate, the identity authentication method further comprises:

using, according to the second key and the identity authentication key, the key derivation algorithm to calculate a pre-shared key used in a next identity authentication.

20. The requester according to claim 18, wherein when the requester determines that the identity of the authentication access controller is legitimate, the identity authentication method further comprises:

calculating, according to information comprising the second key and respective identities of the authentication access controller and the requester, a session key for subsequent confidential communication.

21. The requester according to claim 12, wherein a message sent by the requester to the authentication access controller further comprises a hash value calculated by the requester for a received latest preceding message sent by the authentication access controller.

* * * * *